United States Patent
Kang et al.

(10) Patent No.: US 12,156,163 B2
(45) Date of Patent: Nov. 26, 2024

(54) METHOD FOR TRANSMITTING CAPABILITY INFORMATION OF USER EQUIPMENT AND ELECTRONIC DEVICE THEREFOR

(71) Applicant: Samsung Electronics Co., Ltd., Gyeonggi-do (KR)

(72) Inventors: Daejun Kang, Gyeonggi-do (KR); Hyeonsoo Kim, Gyeonggi-do (KR); Keonyoung Lee, Gyeonggi-do (KR); Yongjae Jung, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 528 days.

(21) Appl. No.: 17/436,253

(22) PCT Filed: Mar. 4, 2020

(86) PCT No.: PCT/KR2020/003077
§ 371 (c)(1),
(2) Date: Sep. 3, 2021

(87) PCT Pub. No.: WO2020/180111
PCT Pub. Date: Sep. 10, 2020

(65) Prior Publication Data
US 2022/0167298 A1 May 26, 2022

(30) Foreign Application Priority Data
Mar. 5, 2019 (KR) .................. 10-2019-0025261

(51) Int. Cl.
*H04W 60/04* (2009.01)
*H04W 36/00* (2009.01)
(Continued)

(52) U.S. Cl.
CPC ....... *H04W 60/04* (2013.01); *H04W 36/0061* (2013.01); *H04W 36/0066* (2013.01);
(Continued)

(58) Field of Classification Search
None
See application file for complete search history.

(56) References Cited

U.S. PATENT DOCUMENTS 9,338,700 B2    5/2016 Schulist et al.
10,104,540 B2  10/2018 Horn et al.
(Continued)

FOREIGN PATENT DOCUMENTS

EP    1 973 360 A1   9/2008
KR    10-2016-0108481 A   9/2016
(Continued)

OTHER PUBLICATIONS

Protocol structure and specifications; 5 pages; https://www.ques10.com/p/5318/protocol-structure-and-specifications-1/.
(Continued)

*Primary Examiner* — Mazda Sabouri
(74) *Attorney, Agent, or Firm* — Cha & Reiter, LLC

(57) ABSTRACT

The present invention is for transmitting capability information of a user equipment (UE), and a method of operating an electronic device according to various embodiments may comprise receiving system information from a cell of a first radio access technology (RAT); generating a message selectively including capability information of the electronic device for the second RAT according to whether the system information includes information about a cell of a second RAT different from the first RAT; and transmitting the message to the cell of the first RAT. In addition, various embodiments are possible.

6 Claims, 18 Drawing Sheets

(51) Int. Cl.
*H04W 36/14* (2009.01)
*H04W 48/14* (2009.01)
*H04W 76/25* (2018.01)

(52) U.S. Cl.
CPC .......... *H04W 48/14* (2013.01); *H04W 76/25* (2018.02); *H04W 36/1443* (2023.05)

(56) References Cited

U.S. PATENT DOCUMENTS

| | | | |
|---|---|---|---|
| 2011/0212746 A1* | 9/2011 | Sarkar | H04W 88/06 |
| | | | 455/574 |
| 2015/0257013 A1 | 9/2015 | Patel et al. | |
| 2015/0264637 A1* | 9/2015 | Zaus | H04W 48/16 |
| | | | 455/434 |
| 2015/0327107 A1 | 11/2015 | Kim et al. | |
| 2016/0255565 A1 | 9/2016 | Kim et al. | |
| 2019/0110190 A1* | 4/2019 | Van Lieshout | H04W 76/27 |
| 2022/0078603 A1* | 3/2022 | Takada | H04W 56/004 |

FOREIGN PATENT DOCUMENTS

| | | |
|---|---|---|
| KR | 10-2016-0130410 A | 11/2016 |
| WO | 2013/091665 A1 | 6/2013 |

OTHER PUBLICATIONS

3GPP TS 38.331 V15.4.0; 474 pages; http://ww.3gpp.org.
3GPP TSG-RAN WG2 NR Ad hoc 0118; R2-1801529; 6 pages.
Korean Office Action dated Aug. 16, 2023.
Notice of Patent Grant dated Feb. 29, 2024.

* cited by examiner

METHOD FOR TRANSMITTING CAPABILITY INFORMATION OF USER EQUIPMENT AND ELECTRONIC DEVICE THEREFOR

CROSS REFERENCE TO RELATED APPLICATIONS

This application is a National Phase Entry of PCT International Application No. PCT/KR2020/003077, which was filed on Mar. 4, 2020, and claims a priority to Korean Patent Application No. 10-2019-0025261, which was filed on Mar. 5, 2019, the contents of which are incorporated herein by reference.

TECHNICAL FIELD

Various embodiments described below relate to a method for transmitting capability information of a user equipment (UE) and an electronic device thereof.

BACKGROUND ART

With the development of technology, in addition to the existing radio access technology (RAT) (e.g., 4th generation (4G) long term evolution (LTE)), a new RAT (e.g., 5G NR (new radio)) is being developed, and thus the network environment may include various RATs. In addition, a terminal capable of supporting a new RAT is also being developed, and such a terminal is required to communicate in a network environment in which various RATs coexist.

DISCLOSURE OF INVENTION

Technical Problem

As technology advances, an electronic device capable of supporting new-radio (NR), which is a 5th generation radio access technology (5G RAT), is being developed. Such an electronic device may support not only NR, but also long term evolution (LTE), which is 4G RAT. The electronic device may be required to access a base station capable of supporting NR in order to receive a 5G service. However, if the 5G network is not sufficiently deployed (deployed), a base station that can support LTE and NR and a base station that can support LTE but cannot support NR may co-exist. In this case, an electronic device capable of supporting LTE and NR may request an initial access to a base station that can support LTE but cannot support NR.

In the initial access procedure, after an RRC connection with the base station is established, the electronic device may transmit a UECapabilityInformation message to the base station in response to receiving a user equipment (UE) capability inquiry message. Since the electronic device may support NR, the UECapabilityInformation message transmitted to the base station may include capability information of the electronic device for NR (or NR capability information of the electronic device). However, since the base station cannot support NR, it cannot interpret and/or decode the NR capability information of the electronic device included in the UECapabilityInformation message, and may transmit an RRCConnectionRelease message to the electronic device. Accordingly, the electronic device 101 capable of supporting LTE and NR cannot normally access and/or register with a base station capable of supporting LTE, and may enter a limited service state.

Accordingly, various embodiments may provide a method for transmitting capability information of a user equipment (UE) and an electronic device thereof.

Various embodiments may provide an electronic device capable of supporting both a first radio access technology (RAT) and a second RAT transmitting capability information of the electronic device to a base station that supports the first RAT but cannot support the second RAT, and method thereof.

Solution to Problem

A method for operating an electronic device according to various embodiments may comprise receiving system information from a cell of a first radio access technology (RAT); generating a message selectively including capability information of the electronic device for the second RAT according to whether the system information includes information about a cell of a second RAT different from the first RAT; and transmitting the message to the cell of the first RAT.

An electronic device according to various embodiments may comprise at least one transceiver, a memory, and at least one processor. The at least one processor may control the at least one transceiver to receive system information from a cell of a first radio access technology (RAT); generate a message selectively including capability information of the electronic device for the second RAT according to whether the system information includes information about a cell of a second RAT different from the first RAT, and transmit the message to the cell of the first RAT.

Advantageous Effects of Invention

According to various embodiments, the electronic device determines whether the base station associated with the cell of the first RAT in which the electronic device camps on can support the second RAT, and according to the determination the electronic device transmits a message selectively including the capability of the electronic device for the second RAT. As a result, a radio resource control (RRC) connection with the network may be prevented from being released, and a normal connection and/or registration of the electronic device to the network and an in service state may be guaranteed.

BEST MODE FOR CARRYING OUT THE INVENTION

Hereinafter, various embodiments are disclosed with reference to the accompanying drawings.

Figure 1:
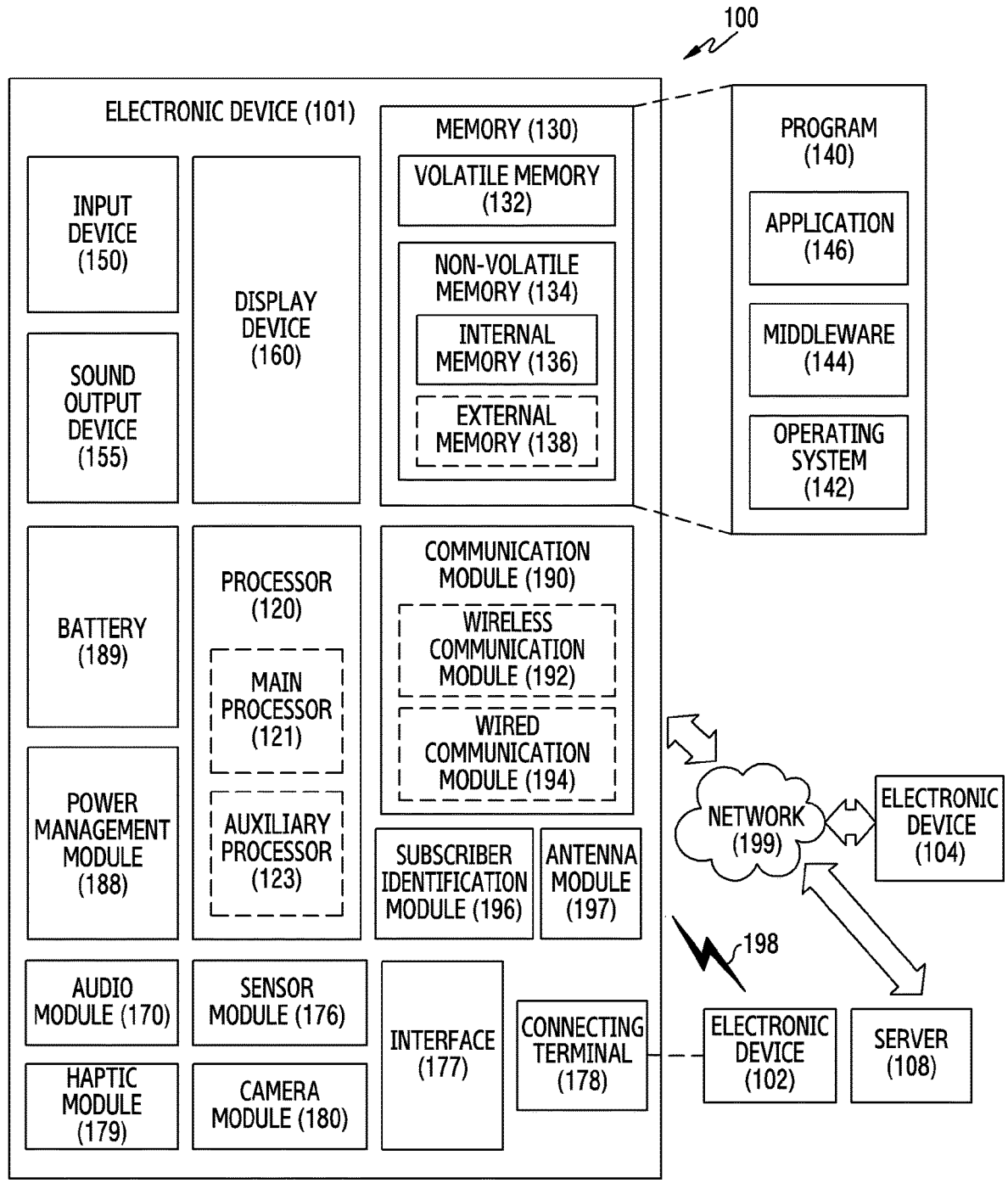
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments of the present invention are disclosed using terms used in some communication standards (e.g., 3rd generation partnership project (3GPP)), but these are only examples. Various embodiments of the present invention may be easily modified and applied on other communication systems.

Figure 2:
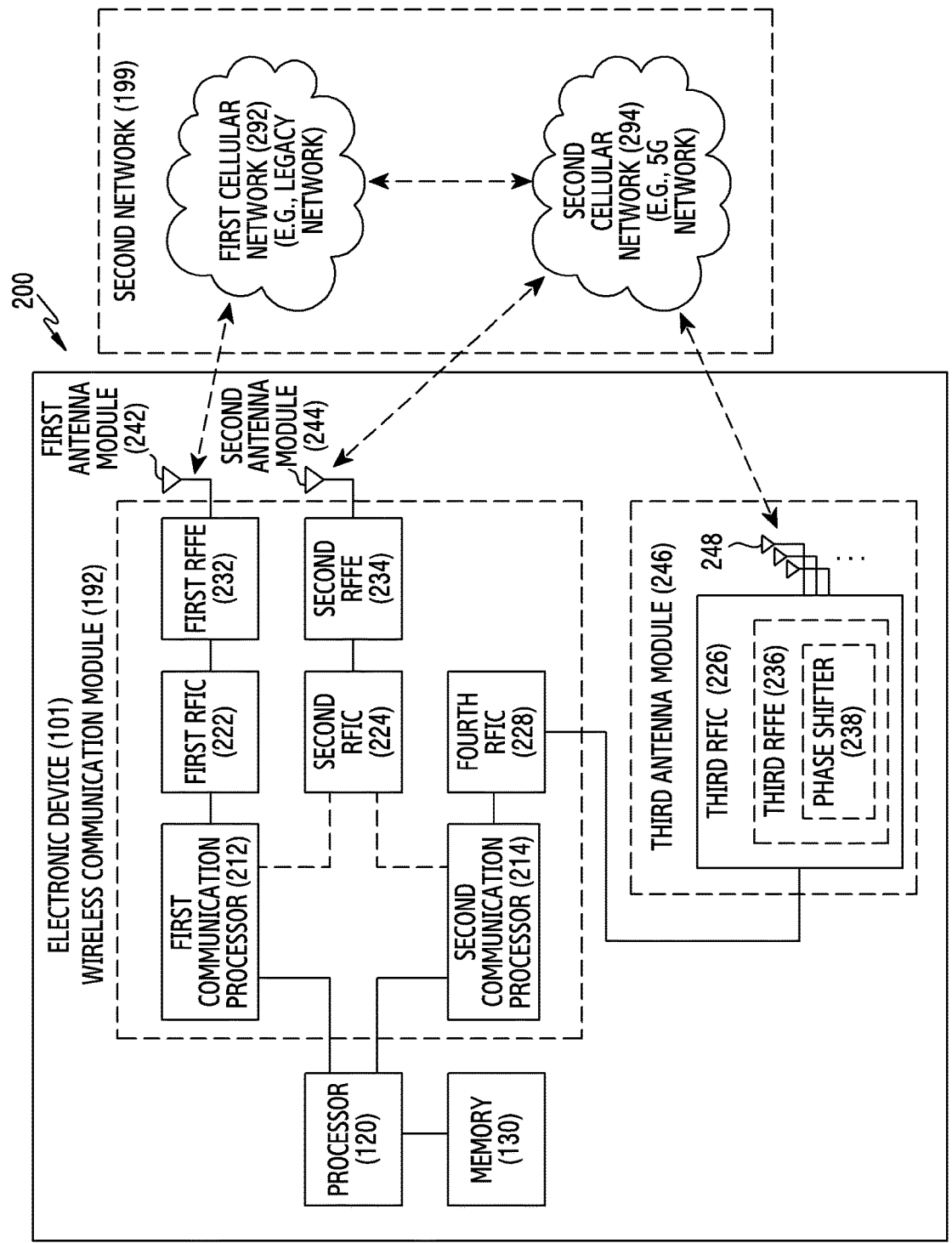
FIG. 2 is a block diagram of an electronic device in a network environment including a plurality of cellular networks, according to various embodiments.

FIG. 2 is a block diagram 200 illustrating an example electronic device 101 in a network environment including a plurality of cellular networks according to various embodiments. Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to another embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to another embodiment, the fourth RFIC 228 may be omitted or may be included as a portion of the third RFIC 226.

The first communication processor 212 can support establishment of a communication channel with a band to be used for wireless communication with the first cellular network 292 and legacy network communication through the established communication channel. According to various embodiments, the first cellular network may be a legacy network including a 2G, 3G, 4G, or Long-Term Evolution (LTE) network. The second communication processor 214 can support establishment of a communication channel corresponding to a designated band (e.g., about 6 GHz--about 60 GHz) of a band to be used for wireless communication with the second cellular network 294 and 5G network communication through the established communication channel. According to various embodiments, the second cellular network 294 may be a 5G network that is defined in 3GPP. Further, according to an embodiment, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel. According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to an embodiment, the first communication processor 212 and the second communication processor 214 is directly or indirectly connected by an interface (not shown), thereby being able to provide or receive data or control signal in one direction or two directions.

The first RFIC 222, in transmission, can converts a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., about 6 GHz about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first communication processor 214. According to an embodiment, the third RFFE 236 may be provided as a portion of the third RFIC 226.

The electronic device 101, according to an embodiment, may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz--about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted, or may be combined with another antenna module and can process RF signals in a plurality of bands.

According to an embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz~about 60 GHz), for example, which is used for 5G network communication, due to a transmission line. Accordingly, the electronic device 101 can improve the quality and the speed of communication with the second cellular network 294 (e.g., 5G network).

According to an embodiment, the antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-Stand Along (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

In various embodiments, the first cellular network 292 and/or the second cellular network 294 may be associated with a specific radio access technology (RAT). For example, RAT may refer to a technology used for wireless access to a network of the electronic device 101 (e.g., the first cellular network 292 and/or the second cellular network 294).

In various embodiments, the RAT associated with the first cellular network 292 may include technology used for wireless access to the legacy network of the electronic device 101. For example, the RAT associated with the first cellular network 292 is at least one of a global system for mobile communications (GSM) as a 2G RAT used for wireless access to the 2G network, time division synchronous code division multiple access (TDSCDMA) and/or wideband code division multiple access (WCDMA) as 3G RAT used for wireless access to 3G networks, and LTE as the 4G RAT for wireless access to 4G or LTE networks.

In various embodiments, the RAT associated with the second cellular network 294 may include technology used for wireless access to the 5G network of the electronic device 101. For example, the RAT associated with the second cellular network 294 may include an NR as a 5G RAT used for wireless access to the 5G network.

An electronic device according to various embodiments (e.g., the electronic device 101 of FIG. 1) may comprise at least one transceiver (e.g., the communication module 190 or the wireless communication module 192 of FIG. 1), a memory (e.g., the memory 130 of FIG. 1), and at least one processor (e.g., the processor 120 of FIG. 1). The at least one processor may control the at least one transceiver to receive system information from a cell of a first radio access technology (RAT); generate a message selectively including capability information of the electronic device for the second RAT according to whether the system information includes information about a cell of a second RAT different from the first RAT, and transmit the message to the cell of the first RAT.

In various embodiments, the information on the cell of the second RAT may include at least one of information indicating that a base station related to the cell of the first RAT supports the second RAT, or information on a neighbor cell of the second RAT, and the capability information of the electronic device for the second RAT includes at least one of information on capability of the electronic device indicating that connection to the cell of the first RAT and the cell of the second RAT is possible, information on capability of the electronic device for access to the first RAT and the second RAT, or information on security capability of the electronic device for the second RAT.

In various embodiments, the at least one processor may determine whether the system information includes information about a cell of the second RAT; and generate the message not including capability information of the electronic device for the second RAT in response to a determination that the system information does not include information about a cell of the second RAT, and the message may include UECapabilityInformation message, RRCConnectionSetupComplete message, a Classmark Change message, an Attach Request message, or a tracking area update (TAU) request message.

In various embodiments, the information on the cell of the second RAT may include an upper layer indicator (upperLayerIndication) indicating that the base station related to the cell of the first RAT supports the second RAT, and the at least one processor may determine whether SIB2 (SystemInformationBlockType2) among the system information includes the upperLayerIndication; and generate a UECapabilityInformation message that does not include capability information of the electronic device for the second RAT in response to determining that the SIB2 does not include the upperLayerIndication.

In various embodiments, the information on the cell of the second RAT may include information about a neighbor cell of the second RAT, and the at least one processor may determine whether a system information block (SIB) including information on the neighboring cell of the second RAT is identified among the system information; and in response to determining that the SIB is not identified, generate the message not including capability information of the electronic device for the second RAT, and the message is UECapabilityInformation message, or a RRCConnectionSetupComplete message.

In various embodiments, the information on the cell of the second RAT may include information about a neighbor cell of the second RAT, and the at least one processor may determine whether system information (SI) including information on a neighboring cell of the second RAT from among the system information is identified; and generate a Classmark Change message that does not include capability information of the electronic device for the second RAT in response to determining that the SI is not identified.

In various embodiments, the information on the cell of the second RAT may include at least one of an upper layer indicator (upperLayerIndication) indicating that the base station related to the cell of the first RAT supports the second RAT or information on a neighboring cell of the second RAT, and the at least one processor may determine whether a system information block SIB including at least one of the upperLayerIndication and information on a neighboring cell of the second RAT is identified from among the system information; and in response to determining that the SIB is not identified, generate the message not including capability information of the electronic device for the second RAT, and the message is an Attach Request message, or a TAU request message.

In various embodiments, the information on the cell of the second RAT may include information on a neighboring cell of the second RAT, and the at least one processor may determine whether the system information includes information about a neighboring cell of the second RAT; and generate an attach request message that does not include capability information of the electronic device for the second RAT in response to a determination that the system information does not include information on the neighboring cell of the second RAT.

In various embodiments, the at least one processor may identify a PLMN including at least one of a public land mobile network (PLMN) associated with the cell of the first RAT or a home PLMN (HPLMN) registered in a subscriber identity module (SIM) of the electronic device; and determine whether the identified PLMN belongs to a whitelist stored in a memory of the electronic device; in response to determining that the identified PLMN belongs to the whitelist, determine whether the system information includes information about a cell of the second RAT, and the whitelist may include at least one PLMN that does not support the second RAT or a number of failed access attempts of the electronic device is less than or equal to a threshold number.

In various embodiments, after transmitting a UECapabilityInformation message that does not include capability information of the electronic device for the second RAT to the cell of the first RAT, the at least one processor may perform cell reselection from the cell of the first RAT to a neighboring cell; receive, from the reselected cell, system information including information about the cell of the second RAT; in response to identifying information on the cell of the second RAT in the system information received from the reselected cell, transmit a TAU request message including information indicating that an update of the capability information of the electronic device is requested; and transmit a UECapabilityInformation message including capability information of the electronic device for the second RAT to the reselected cell based on the transmission of the TAU request message.

In various embodiments, the at least one processor may perform cell reselection from the cell of the first RAT to the cell of the second RAT; receive system information from the cell of the second RAT; without determining whether the system information received from the cell of the second RAT includes information about the cell of the second RAT, generate a capability information message including capability information of the electronic device for the second RAT; and transmit the capability information message to the cell of the second RAT.

In various embodiments, the message may include, regardless of whether the system information includes information about the cell of the second RAT, information indicating whether the electronic device supports EN-DC (EUTRA (evolved universal terrestrial radio access)-new radio dual connectivity) and frequency bands of the second RAT supported by the electronic device.

In various embodiments, the at least one transceiver (e.g., the communication module 190 or the wireless communication module 192 of FIG. 1), may include a transceiver related to the second RAT, and the at least one processor may determine whether the system information includes information on the cell of the second RAT; and deactivate a transceiver of the electronic device associated with the second RAT in response to determining that the system information does not include information about a cell of the second RAT.

In various embodiments, wherein the first RAT may comprise one of LTE (long term evolution), WCDMA (wideband code division multiple access), TDSCDMA (time division synchronous code division multiple access), or GSM (global system for mobile communications), and the second RAT may comprise NR (new radio).

Figure 3A:
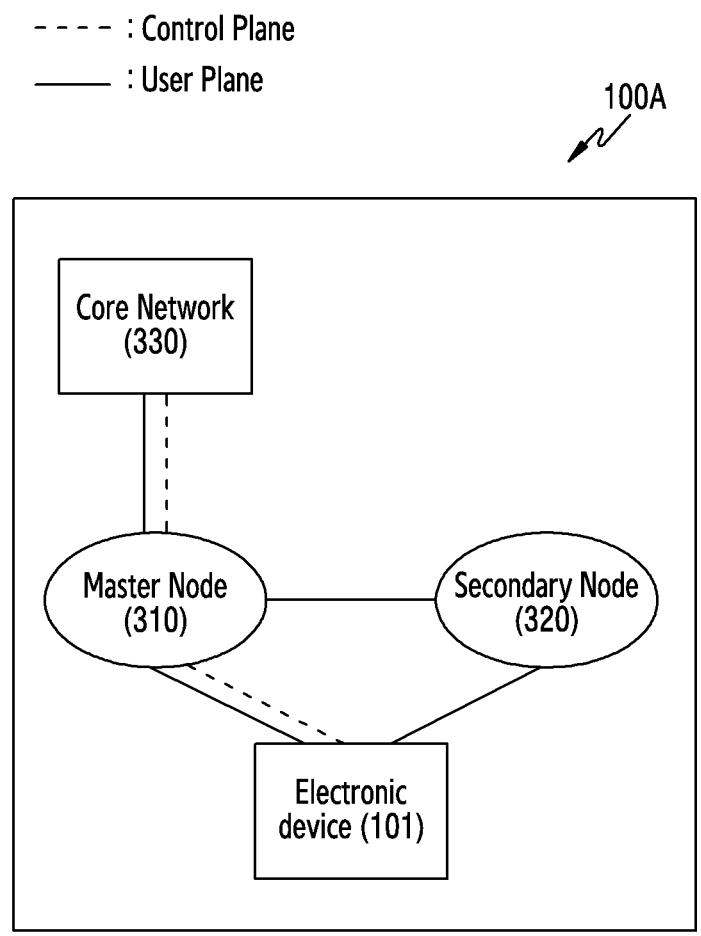
FIGS. 3A to 3C are diagrams illustrating wireless communication systems that provide networks of legacy communication and/or 5G communication according to various embodiments.
Figure 3B:
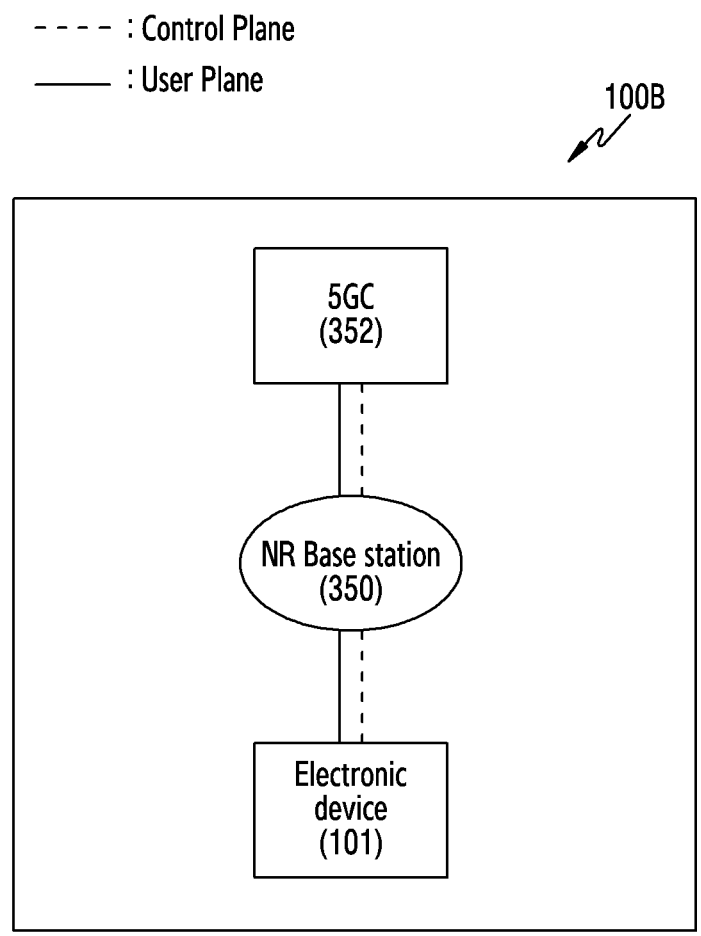
Figure 3C:
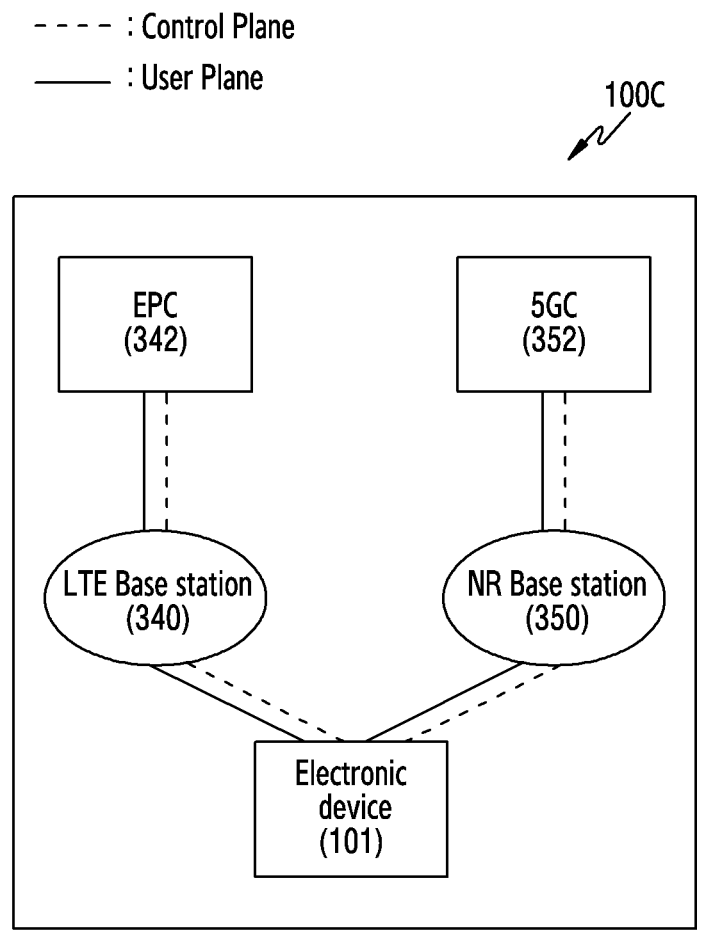

FIGS. 3A to 3C are diagrams illustrating wireless communication systems that provide networks of legacy communication and/or 5G communication according to various embodiments. Referring to FIGS. 3A to 3C, the network environments 100A to 100C may include at least one of a legacy network (e.g., a first cellular network 292) and a 5G network (e.g., a second cellular network 294). The legacy network is, for example, a 3GPP standard 4G or LTE base station 350 (e.g., eNB (eNodeB)) supporting wireless connection with the electronic device 101 and an evolved packet core (EPC) for managing 4G communication) 342. The 5G network may include, for example, a New Radio (NR) base station 350 (e.g., gNB (gNodeB)) supporting wireless connection with the electronic device 101 and a 5GC (5th generation core) 532 managing 5G communication of the electronic device 101.

According to various embodiments, the electronic device 101 may transmit/receive a control message and user data through legacy communication and/or 5G communication. The control message may include, for example, a message related to at least one of security control, bearer setup, authentication, registration, and mobility management of the electronic device 101. The user data may refer to, for example, user data excluding a control message transmitted/received between the electronic device 101 and the core network 330 (e.g., the EPC 342).

Referring to FIG. 3A, the electronic device 101 according to an embodiment may transmit/receive at least one of a control message or user data with at least a part of a 5G network (e.g., an NR base station 350, 5GC 352) using at least a part of a legacy network (e.g., LTE base station 340, EPC 342).

According to various embodiments, the network environment 100A may provide multi-RAT dual connectivity (MR-DC) to the LTE base station 340 and the NR base station 350. In addition, the network environment 100A may include a network environment in which a control message is transmitted and received with the electronic device 101 through one of the core network 330 of the EPC 342 or the 5GC 352.

According to various embodiments, among the LTE base station 340 or the NR base station 350 in the MR-DC environment, one base station operates as a master node (MN) 310 and the other is a secondary node (SN) 320. The MN 310 may be connected to the core network 330 to transmit and receive control messages. The MN 310 and the SN 320 may be connected through a network interface to transmit/receive messages related to radio resource (e.g., communication channel) management with each other.

According to various embodiments, the MN 310 may include the LTE base station 350, the SN 320 may include the NR base station 350, and the core network 330 may include the EPC 342. For example, the MN 310 may transmit and receive a control message through the LTE base station 340 and the EPC 342, and may transmit/receive user data through the LTE base station 350 and the NR base station 350.

Referring to FIG. 3B, according to various embodiments, the 5G network may independently transmit and receive a control message and user data to and from the electronic device 101.

Referring to FIG. 3C, the legacy network and the 5G network according to various embodiments may independently provide data transmission/reception. For example, the electronic device 101 and the EPC 342 may transmit and receive a control message and user data through the LTE base station 350. As another example, the electronic device 101 and the 5GC 352 may transmit and receive a control message and user data through the NR base station 350.

According to various embodiments, the electronic device 101 may be registered with at least one of the EPC 342 and the 5GC 352 to transmit/receive a control message.

According to various embodiments, the EPC 342 or the 5GC 352 may interwork to manage communication of the electronic device 101. For example, movement information of the electronic device 101 may be transmitted/received through an interface between the EPC 342 and the 5GC 352.

Figure 4:
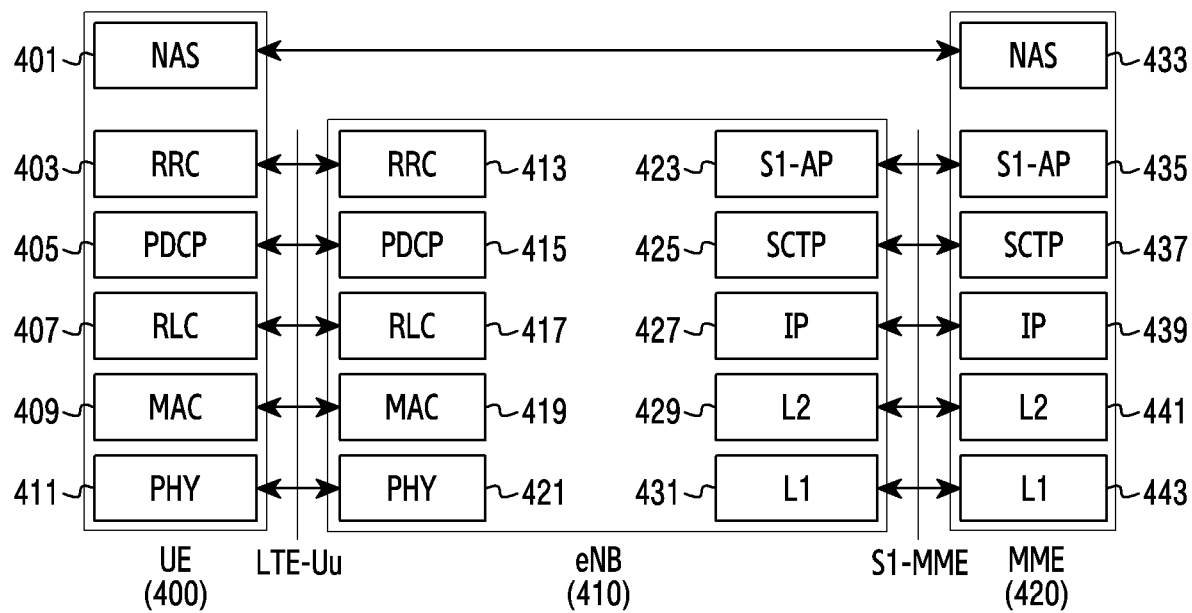
FIG. 4 illustrates an example of a radio protocol structure in a long term evolution (LTE) network according to various embodiments.

FIG. 4 shows an example of a radio protocol structure in a long term evolution (LTE) network according to various embodiments.

Referring to FIG. 4, the user equipment (UE) 400 (e.g., the electronic device 101) and eNB 410 according to various embodiment may include, respectively, RRC (radio resource control) 403 and 413, PDCP (packet data convergence protocol) 405 and 415, RLC (radio link control) 407 and 417), MAC (medium access control) 409 and 419, and PHY (physical layer) 411 and 421 as a radio protocol for LTE-Uu interface between UE 400 and eNB 410.

According to various embodiments, the RRCs 403 and 413 may perform, for example, at least one of system information transmission, RRC connection control, and channel measurement control operation.

According to various embodiments, the PDCPs 405 and 415 may perform at least one of:

IP header compression/decompression, data transmission, PDU (protocol data unit) sequential delivery to the upper layer, data encryption and decryption, or timer-based service data unit (SDU) deduplication.

According to various embodiments, the RLCs 407 and 417 perform at least one of an ARQ operation by reconfiguring a PDCP protocol data unit (PDU) to an appropriate size, an RLC SDU concatenation, splitting and reassembly operation, an RLC SDU deletion operation, and an RLC re-establishment operation.

According to various embodiments, the MACs 409 and 419 may be connected to several RLC layer devices configured in one electronic device. According to various embodiments, MACs 343 and 347 may perform, for example, at least one of multiplexing RLC PDUs to MAC PDUs and demultiplexing RLC PDUs from MAC PDUs, mapping operation between a logical channel and a transport channel, a scheduling information reporting operation, a Hybrid Automatic Repeat and request (HARQ) operation, priority control between logical channels, priority control between electronic devices, MBMS (Multimedia Broadcast Multicast Services) service check operation, transport format selection operation or padding operation.

According to various embodiments, the PHYs 411 and 421 may channel-code and modulate higher layer data (e.g., MAC PDU), make an OFDM symbol, and transmit it through a radio channel. In addition, the PHYs 344 and 348 may perform an operation of demodulating an OFDM symbol received through a radio channel, performing channel decoding, and transmitting the OFDM symbol to a higher layer.

The eNB 410 and a mobility management entity (MME) 420 according to various embodiments may include S1-AP (S1 application protocol)(423, 435), SCTP (stream control transmission protocol)(425, 437), IP (internet protocol)(427, 439), L2 (layer 2)(429, 441) 및 L1 (layer 1)(431, 443), respectively, as a wireless protocol for the S1-MME interface.

According to various embodiments, the S1-APs 423 and 435 may provide a signaling service between the eNB 410 and the MME 420 and perform an E-RAB (evolved universal mobile telecommunication system terrestrial radio access network (E-UTRAN) radio access bearer) management function, UE capability information indication function, mobility function, S1 interface management function, NAS (non-access stratum) signaling transmission function, S1 UE context release function, and UE context modification function.

According to various embodiments, the SCTPs 425 and 437 are used to provide guaranteed message delivery between the eNB 410 and the MME 420, and may enable flexible configuration of IP addresses.

According to various embodiments, IPs 427 and 439 may support transmission between the eNB 410 and the MME 420 for delivering the S1-AP message.

According to various embodiments, the L2 (429, 441) is a data link layer and may support a data link layer protocol such as a point to point protocol (PPP) and an Ethernet IP layer.

According to various embodiments, the L1 (431, 443), as an interface to the physical layer, may perform frame delineation and transmission quality control functions.

The UE 400 and the MME 420 according to various embodiments may include the NAS 433 as a wireless protocol between the UE 400 and the MME 420, respectively.

According to various embodiments, the NAS 433 may support the mobility of the UE 400 and may support session management procedures for establishing and/or maintaining an IP connection between the UE 400 and a packet data network gateway (PDN GW).

Although not shown, according to various embodiments, the UE 400 and the eNB 410 may further include a service data adaptation protocol (SDAP) as a radio protocol for the LTE-Uu interface, respectively. SDAP may map QoS bearers to radio bearers according to quality of service (QoS) requirements.

Figure 5:
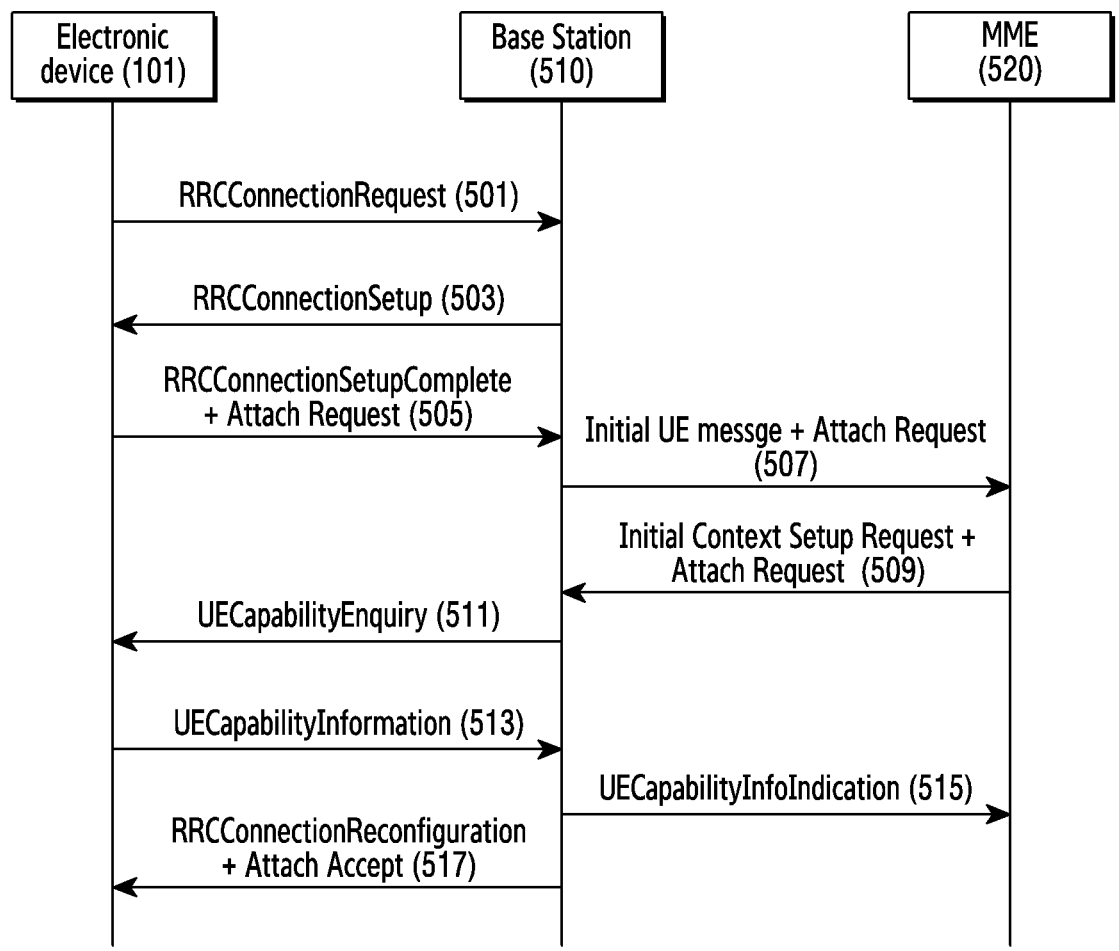
FIG. 5 illustrates an example of a signal flow between an electronic device and a network for an electronic device to access a network according to various embodiments.

FIG. 5 illustrates an example of a signal flow between an electronic device and a network for an electronic device to access a network according to various embodiments of the present disclosure. In the signal flow 500 of FIG. 5, it is assumed that the electronic device 101 can support both LTE and NR, and the base station 510 can support LTE, but cannot support NR. In various embodiments, if the base station 510 cannot interpret a message or information related to NR or the base station 510 cannot support the NR frequency band because the base station 510 does not support the NR-related protocol (e.g., 3 gpp release 15 or higher protocol) or information, the base station 510 may be treated as unable to support NR.

Referring to FIG. 5, according to an embodiment, in operation 501, the electronic device 101 may transmit an RRCConnectionRequest message to the base station 510, and the base station 510 may receive the RRCConnectionRequest message from the electronic device 101. In various embodiments, the RRCConnectionRequest message may be used by the electronic device 101 to request the base station 510 to establish an RRC connection.

According to an embodiment, in operation 503, the base station 510 may transmit an RRCConnectionSetup message to the electronic device 101, and the electronic device 101 may receive the RRCConnectionSetup message from the base station 510. In various embodiments, the RRCConnectionSetup message may be used to allocate a signaling radio bearer (SRB) configuration resource to be used exclusively by the electronic device 101.

According to an embodiment, in operation 505, the electronic device 101 may transmit an RRCConnectionSetupComplete message to the base station 510, and the base station 510 receives the RRCConnectionSetupComplete message from the electronic device 101. In various embodiments, the RRCConnectionSetupComplete message may be used by the electronic device 101 to notify the base station 510 that the establishment of the RRC connection is complete. Also, in operation 505, the electronic device 101 may transmit an Attach Request message through a NAS entity (e.g., the NAS 401 in FIG. 4). In various embodiments, the Attach Request message may be used to request a connection to the base station 510 and may include an identifier such as an international mobile subscriber identity (IMSI). The Attach request message may be piggybacked to the RRCConnectionSetupComplete message, and may be transmitted to the base station 510 together with the RRCConnectionSetupComplete message.

According to an embodiment, in operation 507, the base station 510 may transmit an initial user equipment (UE) message to the MME 520 and may transmit an Attach Request message to the MME through the Initial UE message. For example, the Attach Request message may be delivered by being included in the NAS-PDU (NAS protocol data unit) field of the Initial UE message.

According to an embodiment, in operation 509, the MME 520 may transmit an initial context setup request message to the base station 510. In addition, the MME 520 may transmit an attach accept message through a NAS entity (e.g., NAS

433 in FIG. 4). For example, the MME 520 may determine to approve the connection request of the electronic device 101, and may transmit an attach accept message through the NAS entity according to the determination. The Attach accept message may be delivered to the base station 510 together with the initial context setup request message.

According to an embodiment, in operation 511, the base station 510 may transmit a UECapabilityEnquiry message to the electronic device 101, and the electronic device 101 may receive a UECapabilityEnquiry message from the base station 510. In various embodiments, the UECapabilityEnquiry message may be used to request that the electronic device 101 transmit capability information of the electronic device 101 to the base station 510. The capability information of the electronic device 101 may be information related to the capability of the electronic device 101 required for access to a specific network or RAT.

According to an embodiment, in operation 513, the electronic device 101 may transmit a UECapabilityInformation message to the base station 510, and the base station 510 may receive a UECapabilityInformation message from the electronic device 101. In various embodiments, the UECapabilityInformation message may not include capability information of the electronic device 101 for NR (which may also be referred to as "NR capability information of the electronic device 101"). For example, the UECapabilityInformation message, as a part of the capability information of the electronic device 101 for NR, may not include information about the capability of the electronic device 101 indicating that the connection to the LTE cell and the NR cell is possible (e.g., a parameter related to MR-DC capability or EN-DC (evolved universal terrestrial radio access (EUTRA)-new radio dual connectivity)). Based on the determination that the base station 510 cannot support NR, the electronic device 101 may generates a UECapabilityInformation message that does not include capability information of the electronic device 101 for NR, and may transmit the generated UECapabilityInformation message to the base station 510. For example, when SIB2 received from the base station does not include upperLayerIndication or none of the SIBs received from the base station includes information on the NR neighbor cell, the electronic device 101 determines that the base station 510 is NR may decide not to support it.

According to an embodiment, in operation 515, the base station 510 may transmit a UE CapabilityInfoIndication message to the MME 520. The base station 510 interprets and/or decodes the UECapabilityInformation message that does not include the NR capability information of the electronic device 101, and then transmits the UECapabilityInfoIndication message that does not include the NR capability information of the electronic device 101 to the MME 520.

According to an embodiment, in operation 517, the base station 510 may transmit an RRCConnectionReconfiguration message to the electronic device 101. The Attach Accpet message may be piggybacked to the RRCConnectionReconfiguration message, and the base station 510 may transmit the UECapabilityInfoIndication message to the MME 520 and then transmit the RRCConnecionReconfiguration message together with the Attach Accept message to the electronic device 101.

As described above, the electronic device 101 according to various embodiments transmits the UECapabilityInformation message that does not include the NR capability information of the electronic device 101 to the base station 510 that cannot support NR, therefore the base station 510 may interpret and/or decode the UECapabilityInformaion message, and may be normally connected to and/or registered with a network to be in an in-service state.

In FIG. 5, it is assumed that the first RAT is LTE and the second RAT is NR, and this assumption may be equally applied in the following description for convenience of description. However, various embodiments of the present invention are not limited to LTE and NR and may be applied to different RATs. For example, the first RAT may be any one of LTE, WCDMA, TDSCDMA, or GSM, and the second RAT may be any one of NR, LTE, WCDMA, TDSCDMA, or GSM.

Figure 6:
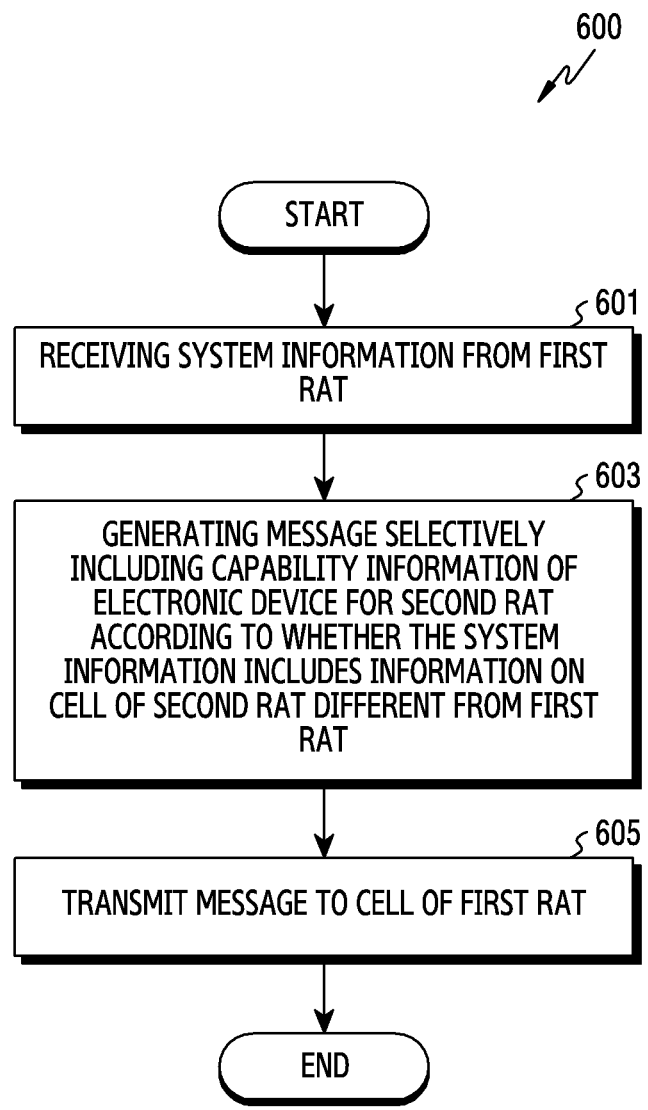
FIG. 6 illustrates an example of an operation of an electronic device according to various embodiments.

FIG. 6 illustrates an example of operation of an electronic device according to various embodiments. The operations illustrated in the flowchart 600 of FIG. 6 may be performed by the electronic device 101 shown in FIGS. 1 and 2 or the wireless communication module 192 of the electronic device 101. In FIG. 6, it is assumed that the electronic device 101 can support the first RAT and the second RAT.

Referring to FIG. 6, according to an embodiment, in operation 601, the electronic device 101 may receive system information from a cell of the first RAT. When the first RAT is a 4G RAT or a 3G RAT, the system information may include at least one system information block (SIB), and when the first RAT is a 2G RAT, the system information may include at least one SI. The system information may be used to determine whether a base station associated with a cell of the first RAT can support the second RAT.

According to an embodiment, in operation 603, the electronic device 101 generates a message selectively including capability information of the electronic device for the second RAT according to whether the system information includes information about a cell of a second RAT different from the first RAT. In various embodiments, the electronic device 101 may determine whether the system information includes information about a cell of the second RAT. For example, when the processor 120 determines that the system information does not include information on the cell of the second RAT, the electronic device 101 determines that the base station associated with the cell of the first RAT cannot support the second RAT, and may generate a message that does not include (or exclude) capability information of the electronic device 101 for the second RAT. As another example, when the processor 120 determines that the system information includes information about the cell of the second RAT, the electronic device 101 determines that the base station associated with the cell of the first RAT can support the second RAT and may generate a message that includes capability information of the electronic device 101 for the second RAT.

According to an embodiment, in operation 605, the electronic device 101 may transmit a message to a cell of the first RAT. For example, when the base station related to the cell of the first RAT can support the second RAT, the base station can interpret and/or decode a message including the capability information of the electronic device 101 for the second RAT. Therefore, the base station interprets and/or decodes the message including the capability information of the electronic device 101 for the second RAT, and then transmit UECapabilityInfoIndication message including capability information of the electronic device 101 for the second RAT to the core network (e.g., mobility management entity (MME) of the core network), and may transmit an RRCConnectionReconfiguration message together with an attach accept message to the electronic device 101. Accordingly, in this case, the electronic device 101 may be normally connected to and/or registered with the network, and may be in an in service state. As another example, when the base station related to the cell of the first RAT cannot support the second RAT, the network may interpret and/or decode a message that does not include the capability information of the electronic device 101 for the second RAT, the electronic device 101 may be normally connected to and/or registered with the network, and may be in a service state.

In various embodiments, the information on the cell of the second RAT may include at least one of information indicating that the base station related to the cell of the first RAT supports the second RAT or information about a neighbor cell of the second RAT. For example, the information on the neighboring cell of the second RAT may include at least one of whether at least one cell of the second RAT or at least one cell of the second RAT is present in the list of neighboring cells included in the system information.

In various embodiments, the capability information of the electronic device 101 for the second RAT may be information related to the capability of the electronic device 101 required for access to the second RAT. For example, the capability information of the electronic device 101 for the second RAT may include at least one of information on the capability of the electronic device 101 indicating that connection to the cell of the first RAT and the cell of the second RAT is possible (e.g., a parameter related to EN-DC capability, a parameter related to MR-DC), information about the capability of the electronic device 101 for access to the first RAT and the second RAT (e.g., inter-RAT radio access capability), or Information about the security capability of the electronic device 101 for the second RAT (e.g., UE additional security information).

In various embodiments, the message generated in operation 603 (or the message transmitted to the cell of the first RAT in operation 605) includes at least information indicating whether the electronic device 101 supports EN-DC and electronic It may include frequency bands of the second RAT supported by the device 101 regardless of whether the system information received from the cell of the first RAT includes information about the cell of the second RAT. Information indicating whether the electronic device 101 supports EN-DC and the frequency bands of the second RAT supported by the electronic device 101 are the main fields that can have an impact to handover (or cell reselection) of the electronic device 101. Accordingly, the message generated in operation 603 (or the message transmitted to the cell of the first RAT in operation 605) may include at least information indicating whether the electronic device 101 supports EN-DC and frequency bands of the second RAT supported by the electronic device 101, regardless of whether the system information received from the cell of the first RAT includes information about the cell of the second RAT. However, this is only an example, and information indicating whether the electronic device 101 supports EN-DC and frequency bands of the second RAT supported by the electronic device 101 may selective included in the message generated according to whether the second RAT is supported in operation 603 (or the message transmitted to the cell of the first RAT in operation 605).

In various embodiments, the message generated in operation 603 (or the message transmitted to the cell of the first RAT in operation 605) may include at least one of a UECapabilityInformation message, an RRCConnectionSetupComplete message, a Classmark Change message, an Attach Request message, or a tracking area update (TAU) request message. For example, when the electronic device 101 generates and transmits the UECapabilityInformation message, the RRCConnectionSetupComplete message, the Classmark Change message, the Attach Request message, and/or the TAU request message to the base station, the base station may decode the messages and may transmit the electronic device 101 capability information to the core network.

In various embodiments, regardless of whether the message includes capability information of the electronic device 101 for the second RAT, the message may include capability information of the electronic device 101 for the first RAT. The capability information of the electronic device 101 for the first RAT may be information related to the capability of the electronic device 101 required for access to the first RAT.

Figure 7:
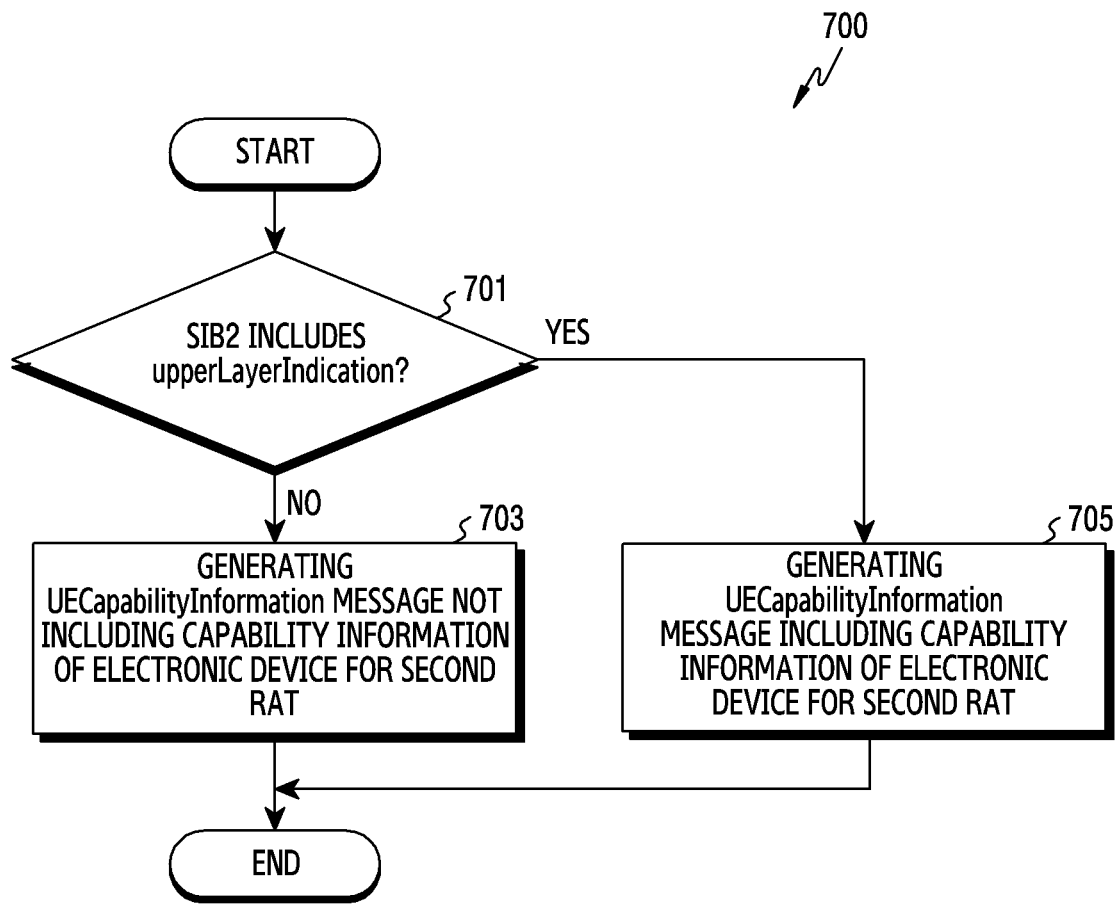
FIG. 7 illustrates an example of an operation of an electronic device for transmitting capability information of the electronic device in communication with a network based on 4G RAT according to various embodiments.

FIG. 7 illustrates an example of an operation of an electronic device for transmitting capability information of the electronic device in communication with a network based on 4G RAT according to various embodiments of the present disclosure. The operations illustrated in the flowchart 700 of FIG. 7 may be performed by the electronic device 101 shown in FIGS. 1 and 2 or the wireless communication module 192 of the electronic device 101.

Operations 701 to 705 in FIG. 7 may be related to operation 603 in FIG. 6.

Referring to FIG. 7, according to an embodiment, in operation 701, the electronic device 101 may determine whether SystemInformationBlockType2 (SIB2) includes upperLayerIndication. The electronic device 101 may determine whether SIB2 among the system information received from the cell of the first RAT includes upperLayerIndication or whether SIB2 including upperLayerIndication among the system information received from the cell of the first RAT is identified. In various embodiments, because upperLayerIndication may be included in SIB2 when the base station supports the second RAT or processes policies and/or information related to the second RAT (or supports a protocol of 3GPP release 15 or higher), upperLayerIndication may indicate that the base station associated with the cell of the first RAT supports the second RAT. For example, when the base station associated with the cell of the first RAT supports the second RAT, SIB2 may include upperLayerIndication. When the base station associated with the cell of the first RAT cannot support the second RAT, SIB2 may not include upperLayerIndication. When SIB2 does not include upperLayerIndication (701—No), the electronic device 101 may perform operation 703. Alternatively, when SIB2 includes upperLayerIndication (701—Yes), the electronic device 101 may perform operation 705.

According to an embodiment, in operation 703, the electronic device 101 may generate a message (e.g., UECapabilityInformation messages) that does not include capability information (e.g., EN-DC capability related parameter, MR-DC capability related parameter) of the electronic device 101 for the second RAT. The electronic device 101 may transmit the generated UECapabilityInformation message to the cell of the first RAT. For example, when SIB2 does not include upperLayerIndication, the electronic device 101 may send UECapabilityInformation message that does not include capability information of the electronic device 101 for the second RAT to the cell of the first RAT in response to the UECapabilityEnquiry message received from the cell of the first RAT.

According to an embodiment, in operation 705, may generate a message (e.g., UECapabilityInformation messages) including capability information (e.g., EN-DC capability related parameter, MR-DC capability related parameter) of the electronic device 101 for the second RAT. The electronic device 101 may transmit the generated UECapabilityInformation message to the cell of the first RAT. For example, when SIB2 includes upperLayerIndication, the electronic device 101 may send UECapabilityInformation message including capability information of the electronic device 101 for the second RAT to the cell of the first RAT in response to the UECapabilityEnquiry message received from the cell of the first RAT.

In various embodiments, although not shown, in operation 701, the electronic device 101 may determine whether SIB2 includes upperLayerIndication, and in addition, whether the SIB including information on the neighboring cell of the second RAT is identified (or, whether at least one SIB includes information about a neighboring cell). For example, when SIB2 does not include upperLayerIndication and the SIB including information on neighboring cells of the second RAT is not identified (or when no SIB includes information on neighboring cells of the second RAT), the electronic device 101 may generate a UECapabilityInformation message that does not include capability information of the electronic device 101 for the second RAT in operation 703. As another example, when SIB2 includes upperLayerIndication or SIB including information on neighboring cells of the second RAT is identified (or when at least one SIB includes information on neighboring cells of the second RAT), the electronic device 101 may generate a UECapabilityInformation message including capability information of the electronic device 101 for the second RAT in operation 705. In various embodiments, the operation for determining whether SIB2 includes upperLayerIndication is performed before or after or simultaneously with the operation for determining whether a SIB including information about a neighboring cell of the second RAT is identified. Also, in various embodiments, the SIB may include SIB2.

In various embodiments, although not shown, in operation 701, instead of determining whether SIB2 includes upperLayerIndication, the electronic device 101 may determine whether the SIB including information about the neighboring cell of the second RAT is identified (or, whether the at least one SIB includes information about a neighboring cell of the second RAT). For example, when the SIB including information on the neighboring cell of the second RAT is not identified (or when no SIB includes information on the neighboring cell of the second RAT), the electronic device 101, in operation 703, may generate a UECapabilityInformation message that does not include capability information of the electronic device 101 for the second RAT. As another example, when an SIB including information on a neighboring cell of the second RAT is identified (or when at least one SIB includes information on a neighboring cell of the second RAT), the electronic device 101 may generate, in operation 705, a UECapabilityInformation message including capability information of the electronic device 101 for the second RAT. In various embodiments, the at least one SIB may include SIB2.

In various embodiments, parameters related to EN-DC capability may have a format as shown in <Table 1> below.

TABLE 1

IRAT-ParametersNR-r15 ::= SEQUENCE {
en-DC-r15 ENUMERATED {supported} OPTIONAL
eventB2-r15 ENUMERATED {supported} OPTIONAL, supportedBandListNR-r15

TABLE 1-continued

```
SupportedBandListNR-r15 OPTIONAL
}
PDCP-ParametersNR-r15 ::= SEQUENCE {
rohc-Profiles-r15 ROHC-ProfileSupportList-r15,
rohc-ContextMaxSessions-r15 ENUMERATED {
cs2, cs4, cs8, cs12, cs16, cs24, cs32,
cs48, cs64, cs128, cs256, cs512, cs1024,
cs16384, spare2, spare1 } DEFAULT cs16,
rohc-ProfilesUL-Only-r15 SEQUENCE {
profile0x0006-r15 BOOLEAN
},
rohc-ContextContinue-r15 ENUMERATED {supported} OPTIONAL,
outOfOrderDelivery-r15 ENUMERATED {supported} OPTIONAL,
sn-SizeLo-r15 ENUMERATED {supported}OPTIONAL,
ims-VoiceOverNR-PDCP-MCG-Bearer-r15 ENUMERATED {supported} OPTIONAL,
ims-VoiceOverNR-PDCP-SCG-Bearer-r15 ENUMERATED {supported} OPTIONAL
}
ROHC-ProfileSupportList-r15 ::= SEQUENCE {
profile0x0001-r15 BOOLEAN,
profile0x0002-r15 BOOLEAN,
profile0x0003-r15 BOOLEAN,
profile0x0004-r15 BOOLEAN,
profile0x0006-r15 BOOLEAN,
profile0x0101-r15 BOOLEAN,
profile0x0102-r15 BOOLEAN,
profile0x0103-r15 BOOLEAN,
profile0x0104-r15 BOOLEAN
}
SupportedBandListNR-r15 ::= SEQUENCE (SIZE (1..maxBandsNR-r15)) OF SupportedBandNR-r15
SupportedBandNR-r15 ::= SEQUENCE {
bandNR-r15 FreqBandIndicatorNR-r15
}
```

Referring to <Table 1>, according to various embodiments, the 'IRAT-ParametersNR-r15' parameter may include an 'en-DC-r15' item (or information) indicating whether the electronic device 101 can support EN-DC, an 'eventB2-r15' item indicating whether the electronic device 101 supports event B2, and 'supportedBandListNR-r15' item indicating a list of NR bands that the electronic device 101 can support. When the electronic device 101 supports the NR stand alone (SA) operation, the 'evnetB2-r15' item may be set to 'supported'. The 'PDCP-ParametersNR-r15' item indicates parameters for robust header compression (ROHC) in a packet data convergence protocol (PDCP) layer, and the 'rohc-ConextContinue-r15' item may indicate whether the electronic device 101 supports the ROHC context continuation operation when the electronic device 101 does not reset the current ROHC context according to the handover. The 'ROHC-ProfileSupportList-r15' item may indicate ROHC profiles supported by the electronic device 101 in uplink and downlink.

In an embodiment, the electronic device 101 may selectively include the 'IRAT-ParametersNR-r15' parameter of <Table 1> in the UECapabilityInformation message. Alternatively, the electronic device 101 may selectively include at least one of the items included in the 'IRAT-ParametersNR-r15' parameter (e.g., en-DC-r15 item included in the IRAT-ParametersNR-r15 parameter) into the UECapabilityInformation message.

In various embodiments, parameters related to MR-DC capability may be expressed as in Table 2 below:

TABLE 2

```
BandCombinationList ::= SEQUENCE (SIZE (1..maxBandComb)) OF BandCombination
BandCombination ::= SEQUENCE {
bandList SEQUENCE (SIZE (1..maxSimultaneousBands)) OF BandParameters,
feature SetCombination FeatureSetCombinationId,
ca-ParametersEUTRA   ca-ParametersNR CA-ParametersNR   OPTIONAL,
mrdc-Parameters   MRDC-Parameters           OPTIONAL,
supportedBandwidthCombinationSet   BIT STRING (SIZE (1..32)) OPTIONAL,
powerClass-v1530   ENUMERATED {pc2}           OPTIONAL
}
BandParameters ::= CHOICE {
eutra SEQUENCE {
bandEUTRA FreqBandIndicatorEUTRA,
ca-BandwidthClassDL-EUTRA   CA-BandwidthClassEUTRA   OPTIONAL,
ca-BandwidthClassUL-EUTRA   CA-BandwidthClassEUTRA   OPTIONAL
},
nr   SEQUENCE {
bandNR   FreqBandIndicatorNR,
ca-BandwidthClassDL-NR   CA-BandwidthClassNR   OPTIONAL,
ca-BandwidthClassUL-NR   CA-BandwidthClassNR   OPTIONAL
}
}
```

In various embodiments, the UECapabilityInformation message may include, regardless of whether the system information received from the cell of the first RAT includes information about the cell of the second RAT, information indicating whether at least the electronic device 101 supports EN-DC (e.g., 'en-DC-r15' item of 'IRAT-ParametersNR-r15' parameter), and frequency bands of the second RAT supported by the electronic device 101 (e.g., a 'supportedBandListNR-r15' item of the 'IRAT-ParametersNR-r15' parameter). However, this is exemplary and information indicating whether the electronic device 101 supports EN-DC and frequency bands of the second RAT supported by the electronic device 101 (a parameter and/or an item included in the parameter) may be also selectively included in the UECapabilityInformation message according to whether a cell related to the first RAT supports the second RAT. For example, when the system information received from the cell of the first RAT does not include the information on the cell of the second RAT, the electronic device 101 may generate the UECapabilityInformation message which does not include information indicating whether the electronic device 101 supports EN-DC and the frequency bands of the second RAT supported by the electronic device 101 as well as other capability information of the electronic device 101 for the second RAT. As another example, when the system information received from the cell of the first RAT includes information about the cell of the 2nd RAT, the electronic device 101 may generate the UECapabilityInformation message including information indicating whether the electronic device 101 supports EN-DC and the frequency bands of the second RAT supported by the electronic device 101 as well as other capability information of the electronic device 101 for the second RAT.

Figure 8:
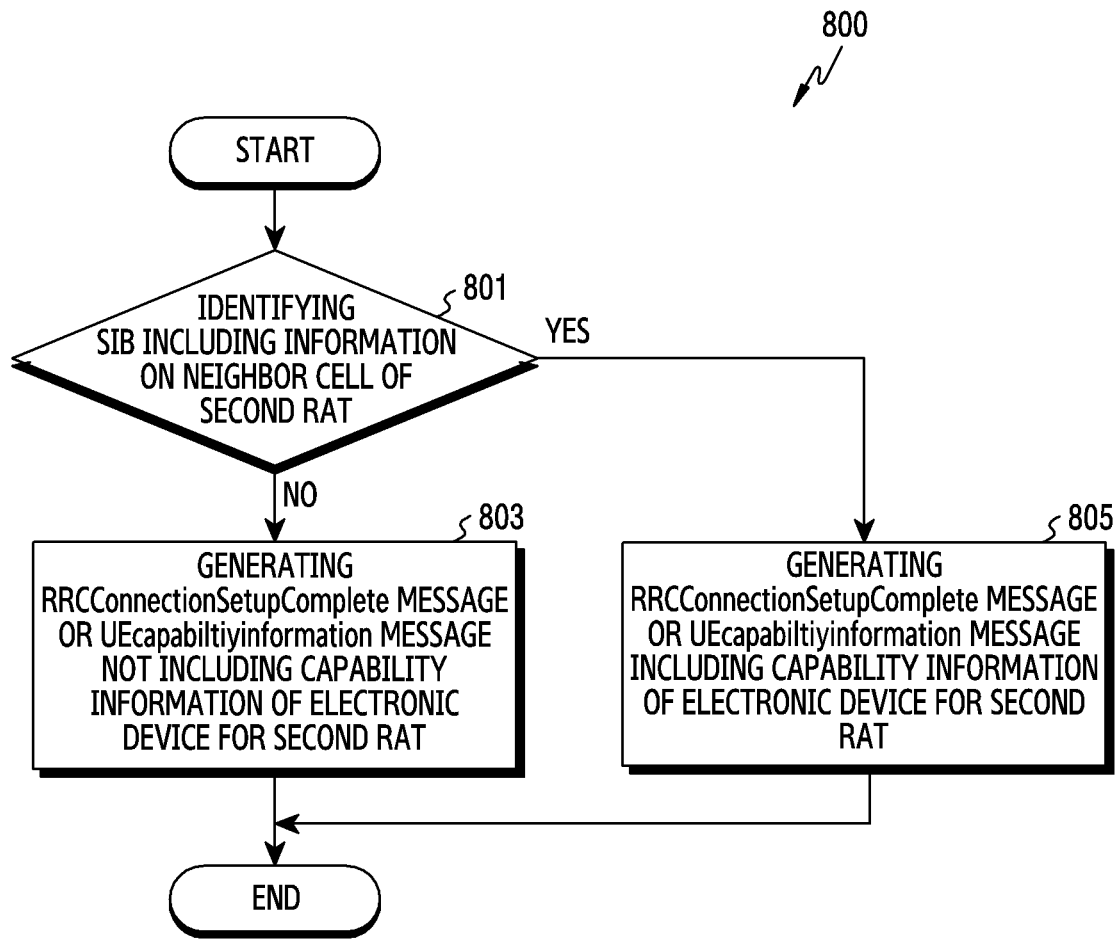
FIG. 8 illustrates an example of an operation of an electronic device for transmitting capability information of the electronic device in communication with a network based on 3G RAT according to various embodiments.

FIG. 8 illustrates an example of an operation of an electronic device for transmitting capability information of the electronic device in communication with a network based on 3G RAT according to various embodiments of the present disclosure. The operations illustrated in the flowchart 800 of FIG. 8 may be performed by the electronic device 101 shown in FIGS. 1 and 2 or the wireless communication module 192 of the electronic device 101.

Operations 801 to 805 in FIG. 8 may be related to operation 603 in FIG. 6.

Referring to FIG. 8, according to an embodiment, in operation 801, the electronic device 101 may determine whether an SIB including information on a neighboring cell of the second RAT is identified. The electronic device 101 may determine whether an SIB including information on a neighboring cell of the second RAT is identified among the system information received from the cell of the first RAT, or whether any SIB among the system information received from the cell of the first RAT includes information about the neighboring cell of the second RAT. In various embodiments, that the SIB received from the cell of the first RAT includes information about the neighboring cell of the second RAT may indicate that the base station related to the cell of the first RAT supports the second RAT. For example, when the base station related to the cell of the first RAT supports the second RAT, an SIB including information on the neighboring cell of the second RAT is identified, or at least one SIB may contain information related to the neighboring cell of the second RAT. On the other hand, if the base station associated with the cell of the first RAT cannot support the second RAT, the SIB including information on the neighboring cell of the second RAT is not identified, or no SIB may not contain information related to the neighboring cell of the second RAT. If the SIB including the information on the neighboring cell of the second RAT is not identified (801—No), the electronic device 101 may perform operation 803. Alternatively, when the SIB including information on the neighboring cell of the second RAT is identified (801—Yes), the electronic device 101 may perform operation 805.

According to an embodiment, in operation 803, the electronic device 101 may generate a UECapabilityInformation message or an RRCConnectionSetupComplete message that does not include capability information (e.g., inter-RAT radio access capability) of the electronic device 101 for the second RAT. The electronic device 101 may transmit the generated UECapabilityInformation message or the RRCConnectionSetupComplete message. For example, if the SIB including information on the neighboring cell of the second RAT is not identified, in response to the UECapabilityEnquiry message received from the cell of the first RAT, the electronic device 101 may generate a UECapabilityInformation message that does not include the capability information of 101 for the second RAT and transmit the UECapabilityInformation message to the cell of the first RAT.

As another example, when the SIB including the information on the neighboring cell of the second RAT is not identified, the electronic device 101 may generate a RRCConnectionSetupComplete message that does not include the capability information of 101 for the second RAT while the electronic device 101 establishes an RRC connection with the network.

In operation 805, the electronic device 101 may generate a UECapabilityInformation message or an RRCConnectionSetupComplete message including capability information (e.g., inter-RAT radio access capability) of the electronic device 101 for the second RAT. The electronic device 101 may transmit a UECapabilityInformation message or an RRCConnectionSetupComplete message to the cell of the first RAT. For example, when the SIB including information on the neighboring cell of the second RAT is identified, the electronic device 101 may transmit a UECapabilityInformation message including capability information of the electronic device 101 for the second RAT may be transmitted to the cell of the first RAT in response to the UECapabilityEnquiry message received from the cell of the first RAT. As another example, when the SIB including information on the neighboring cell of the second RAT is identified, the electronic device 101 may transmit the RRCConnectionSetupComplete message including the capability information of the electronic device for the second RAT to the cell of the first RAT.

In various embodiments, the parameters related to the inter-RAT radio access capability may include parameters related to the EN-DC capability of the electronic device 101 (e.g., parameters related to the EN-DC capability expressed in <Table 1> above) and/or parameters related to the MR-DC capability of the electronic device 101 (e.g., parameters related to the MR-DC capability shown in Table 2 above).

In various embodiments, the RRCConnectionSetupComplete message may include, regardless of whether the system information received from the cell of the first RAT includes information about the cell of the second RAT, information indicating whether at least the electronic device 101 supports EN-DC and frequency bands of the second RAT supported by the electronic device 101. For example, in the RRCConnectionSetupComplete message, information indicating whether the electronic device 101 supports EN-DC and the frequency bands of the second RAT supported by the electronic device 101 may be expressed as shown in Table 3 above. However, this is an example, and information indicating whether the electronic device 101 supports EN-DC and frequency bands of the second RAT supported by the electronic device 101 may be selectively included in the RRCConnectionSetupComplete message according to whether the cell related to the first RAT supports the second RAT either. For example, when the system information received from the cell of the first RAT does not include the information on the cell of the second RAT, the electronic device 101 may generate an RRCConnectionSetupComplete message that does not include information indicating whether the electronic device 101 supports EN-DC and frequency bands of the second RAT supported by the electronic device 101 as well as other capability information of the electronic device 101 for the second RAT. As another example, when the system information received from the cell of the first RAT includes information about the cell of the second RAT, the electronic device 101 may generate an RRCConnectionSetupComplete message including information indicating whether the electronic device 101 supports EN-DC and frequency bands of the second RAT supported by the electronic device 101 as well as other capability information of the electronic device 101 for the second RAT.

Figure 9:
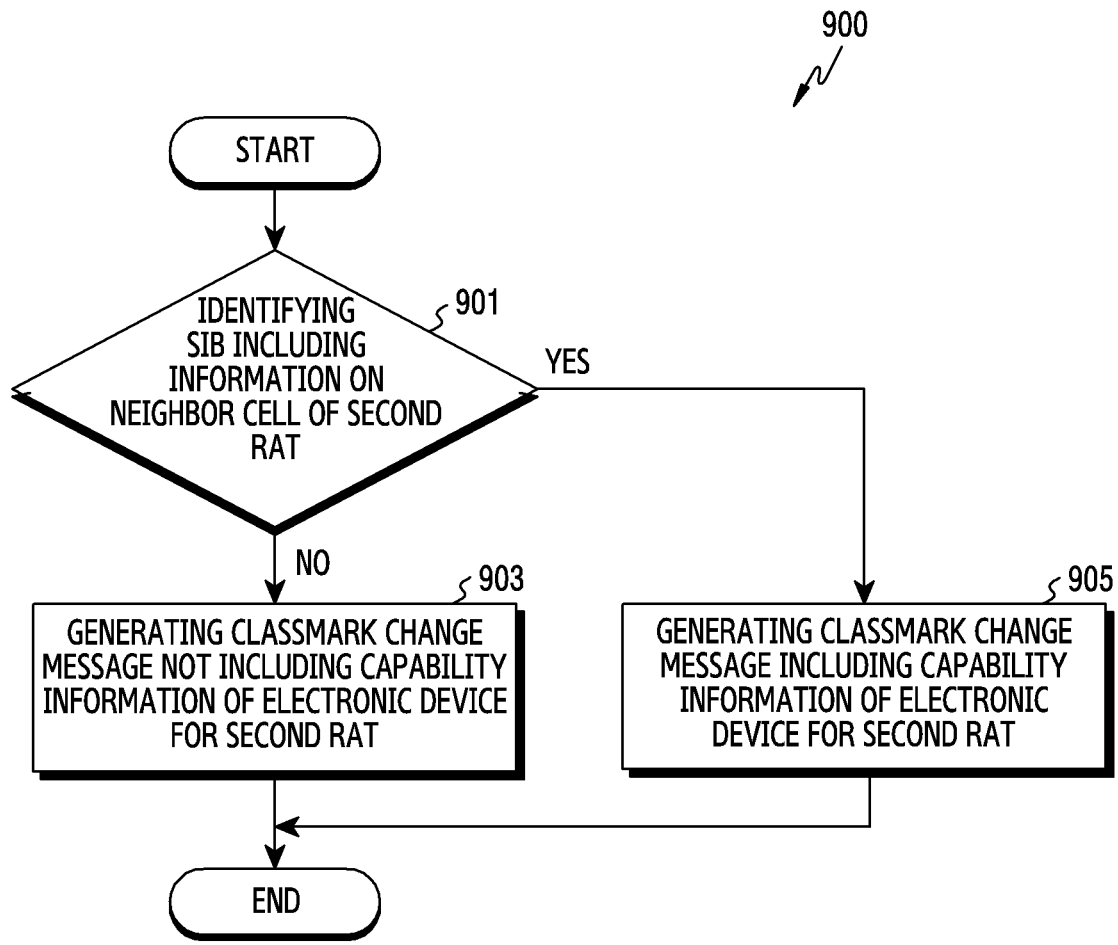
FIG. 9 illustrates an example of an operation of an electronic device for transmitting capability information of the electronic device in communication with a network based on 2G RAT according to various embodiments.

FIG. 9 illustrates an example of an operation of an electronic device for transmitting capability information of the electronic device in communication with a network based on 2G RAT according to various embodiments of the present disclosure; The operations illustrated in the flowchart 900 of FIG. 9 may be performed by the electronic device 101 illustrated in FIGS. 1 and 2 or the wireless communication module 1920 of the electronic device 101.

In FIG. 9, operations 901 to 905 may be related to operation 603 of FIG. 6.

Referring to FIG. 9, according to an embodiment, in operation 901, the electronic device 101 may determine whether system information (SI) including information on a neighboring cell of the second RAT is identified. The electronic device 101 may determine, among the system information received from the cell of the first RAT, whether an SI including information about a neighboring cell of the second RAT is identified, or whether SI among the system information received from the cell of the first RAT includes information about the neighboring cell of the second RAT. In various embodiments, that the SI received from the cell of the first RAT includes information about the neighboring cell of the second RAT may indicate that the base station related to the cell of the first RAT supports the second RAT. In other words, when the base station related to the cell of the first RAT supports the second RAT, the SI including information about the neighboring cell of the second RAT is identified, or at least one SI may include information about a neighboring cell of the second RAT. On the other hand, if the base station associated with the cell of the first RAT cannot support the second RAT, SI including information about the neighboring cell of the second RAT is not identified, or no SI may include information on neighboring cells of the second RAT. When an SI including information on a neighboring cell of the second RAT is not identified (or when no SI includes information on a neighboring cell of the second RAT) (901—No), the electronic device 101 may perform operation 903. On the other hand, when the SIB including information on the neighboring cell of the second RAT is identified (or when at least one SI includes information on the neighboring cell of the second RAT) (901—Yes), the electronic device 101 may perform operation 905.

According to an embodiment, in operation 903, the electronic device 101 may generate a Classmark Change message that does not include capability information of the electronic device 101 for the second RAT. Furthermore, the electronic device 101 may transmit the generated Classmark Change message. For example, when the SI including information on the neighboring cell of the second RAT is not identified, the electronic device 101 sends a UECapabilityInformation message that does not include the capability information of the electronic device 101 for the second RAT to the cell of the first RAT.

According to an embodiment, in operation 905, the electronic device 101 may generate a Classmark Change message including capability information of the electronic device 101 for the second RAT. Furthermore, the electronic device 101 may transmit the generated Classmark Change message to the cell of the first RAT. For example, when the SI including information on the neighboring cell of the second RAT is identified, the electronic device 101 transmits the first Classmark Change message including the capability information of the electronic device 101 for the second RAT to the cell of the first RAT.

In various embodiments, when the Classmark Change message includes capability information of the electronic device 101 for the second RAT, the Classmark Change message may include, as capability information of the electronic device 101 for the second RAT, parameters related to the EN-DC capability of the electronic device 101 (e.g., parameters related to the EN-DC capability expressed in <Table 1> above), parameters related to the MR-DC capability of the electronic device 101 (e.g., parameters related to the MR-DC capability shown in Table 2 above), and/or parameters related to inter-RAT radio access capability of the electronic device 101.

In various embodiments, the Classmark Change message may include, regardless of whether the system information received from the cell of the first RAT includes information about the cell of the second RAT, information indicating whether at least the electronic device 101 supports EN-DC and frequency bands of the second RAT supported by the electronic device 101. For example, in the Classmark Change message, information indicating whether the electronic device 101 supports EN-DC and the frequency bands of the second RAT supported by the electronic device 101 may be expressed as shown in Table 3 above. However, this is an example, and information indicating whether the electronic device 101 supports EN-DC and frequency bands of the second RAT supported by the electronic device 101 may be selectively included in the Classmark Change message according to whether the cell related to the first RAT supports the second RAT either. For example, when the system information received from the cell of the first RAT does not include the information on the cell of the second RAT, the electronic device 101 may generate an Classmark Change message that does not include information indicating whether the electronic device 101 supports EN-DC and frequency bands of the second RAT supported by the electronic device 101 as well as other capability information of the electronic device 101 for the second RAT. As another example, when the system information received from the cell of the first RAT includes information about the cell of the second RAT, the electronic device 101 may generate an Classmark Change message including information indicating whether the electronic device 101 supports EN-DC and frequency bands of the second RAT supported by the electronic device 101 as well as other capability information of the electronic device 101 for the second RAT.

Figure 10:
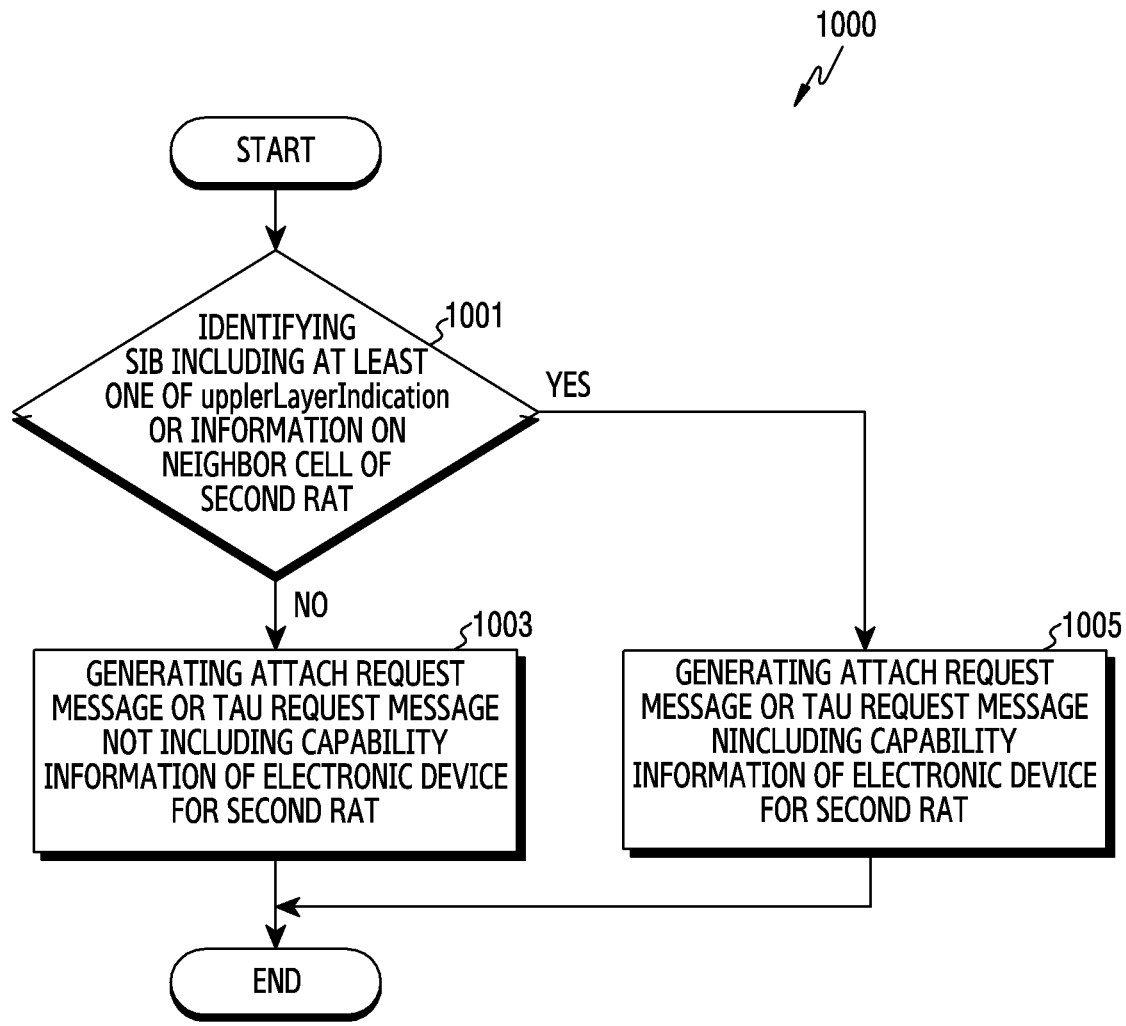
FIG. 10 illustrates an example of an operation of an electronic device for transmitting capability information of the electronic device through a non-access stratum (NAS) entity according to various embodiments.

FIG. 10 illustrates an example of an operation of an electronic device for transmitting capability information of the electronic device through a non-access stratum (NAS) entity according to various embodiments of the present disclosure. The operations illustrated in the flowchart 1000 of FIG. 10 may be performed by the electronic device 101 shown in FIGS. 1 and 2 or the wireless communication module 192 of the electronic device 101. In FIG. 10, the RAT on which the communication between the electronic device 101 and the network is based may be a 4G RAT.

Operations 1001 to 1005 in FIG. 10 may be related to operation 603 in FIG. 6.

Referring to FIG. 10, according to an embodiment, in operation 1001, the electronic device 101 may determine whether an SIB including at least one of upperLayerIndication and information on a neighboring cell of the second RAT is identified. For example, the electronic device 101 determines whether an SIB (e.g., SIB2) including upperLayerIndication is identified among system information received from the cell of the first RAT, and/or whether an SIB including information on a neighboring cell of the second RAT is identified among the system information received from the cell of the first RAT. In various embodiments, the SIB (e.g., SIB2) including upperLayerIndication and the SIB including information on the neighboring cell of the second RAT may be the same or different. When SIB2 including upperLayerIndication is not identified (or SIB2 does not include upperLayerIndication) and SIB including information about a neighboring cell of the second RAT is not identified (or no SIB includes information on a neighbor cell of the second RAT) (1001—No), the electronic device 101 may perform operation 1003. On the other hand, when SIB2 including upperLayerIndication is identified (or SIB2 includes upperLayerIndication) or SIB including information about a neighboring cell of the second RAT is identified (or at least one SIB includes information on a neighbor cell of the second RAT) (1001—Yes), the electronic device 101 may perform operation 1005.

According to an embodiment, in operation 1003, the electronic device 101 may generate an Attach Request message or TAU Request message that does not include capability information of the electronic device 101 for the second RAT (e.g., information on the security capability of the electronic device 101 for the second RAT). Furthermore, the electronic device 101 may transmit the generated Attach Request message or TAU Request message. For example, when SIB2 does not include upperLayerIndication and a SIB including information on a neighboring cell of the second RAT is not identified, the electronic device 101 may transmit the Attach Request message that does not include capability information of the electronic device 101 for the second RAT during connecting to or initial access to the network. As another example, when SIB2 does not include upperLayerIndication and the SIB including information on the neighboring cell of the second RAT is not identified, the electronic device 101 may transmit TAU Request message that does not include capability information of the electronic device 101 for the second RAT under the circumstance that update of the tracking area as the electronic device 101 moves is required.

According to an embodiment, in operation 1003, the electronic device 101 may generate an Attach Request message or TAU Request message including capability information of the electronic device 101 for the second RAT (e.g., information on the security capability of the electronic device 101 for the second RAT). Furthermore, the electronic device 101 may transmit the generated Attach Request message or TAU Request message. For example, when SIB2 includes upperLayerIndication or a SIB including information on a neighboring cell of the second RAT is identified, the electronic device 101 may transmit the Attach Request message including capability information of the electronic device 101 for the second RAT during connecting to or initial access to the network. As another example, when SIB2 includes upperLayerIndication or the SIB including information on the neighboring cell of the second RAT is identified, the electronic device 101 may transmit TAU Request message that including capability information of the electronic device 101 for the second RAT under the circumstance that update of the tracking area as the electronic device 101 moves is required.

In various embodiments, the information about the security capability of the electronic device 101 for the second RAT may include UE additional security information. Additional UE security information may have a format as shown in Table 3 below:

TABLE 3

| 8 | 7 | 6 | 5 | 4 | 3 | 2 | 1 | |
|---|---|---|---|---|---|---|---|---|
| UE additional security capability JET | | | | | | | | octet 1 |
| Length of UE additional security capability contents | | | | | | | | octet 2 |
| 5G-EA0 | 128-5G-EA1 | 128-5G-EA2 | 128-5G-EA3 | 5G-EA4 | 5G-EA5 | 5G-EA6 | 5G-EA7 | octet 3 |
| 5G-EA8 | 5G-EA9 | 5G-EA10 | 5G-EA11 | 5G-EA12 | 5G-EA13 | 5G-EA14 | 5G-EA15 | octet 4 |
| 5G-IA0 | 5G-IA1 | 5G-IA2 | 5G-IA3 | 5G-IA4 | 5G-IA5 | 5G-IA6 | 5G-IA7 | octet 5 |
| 5G-IA8 | 5G-IA9 | 5G-IA10 | 5G-IA11 | 5G-IA12 | 5G-IA13 | 5G-IA14 | 5G-IA15 | octet 6 |

In an embodiment, the electronic device 101 may selectively include additional UE security information having a format as shown in Table 3 in the Attach Request message and/or the TAU Request message. Alternatively, the electronic device 101 may selectively include at least one of items included in the additional UE security information (e.g., 'UE additional security capability IEI') in the Attach Request message and/or the TAU Request message.

Figure 11:
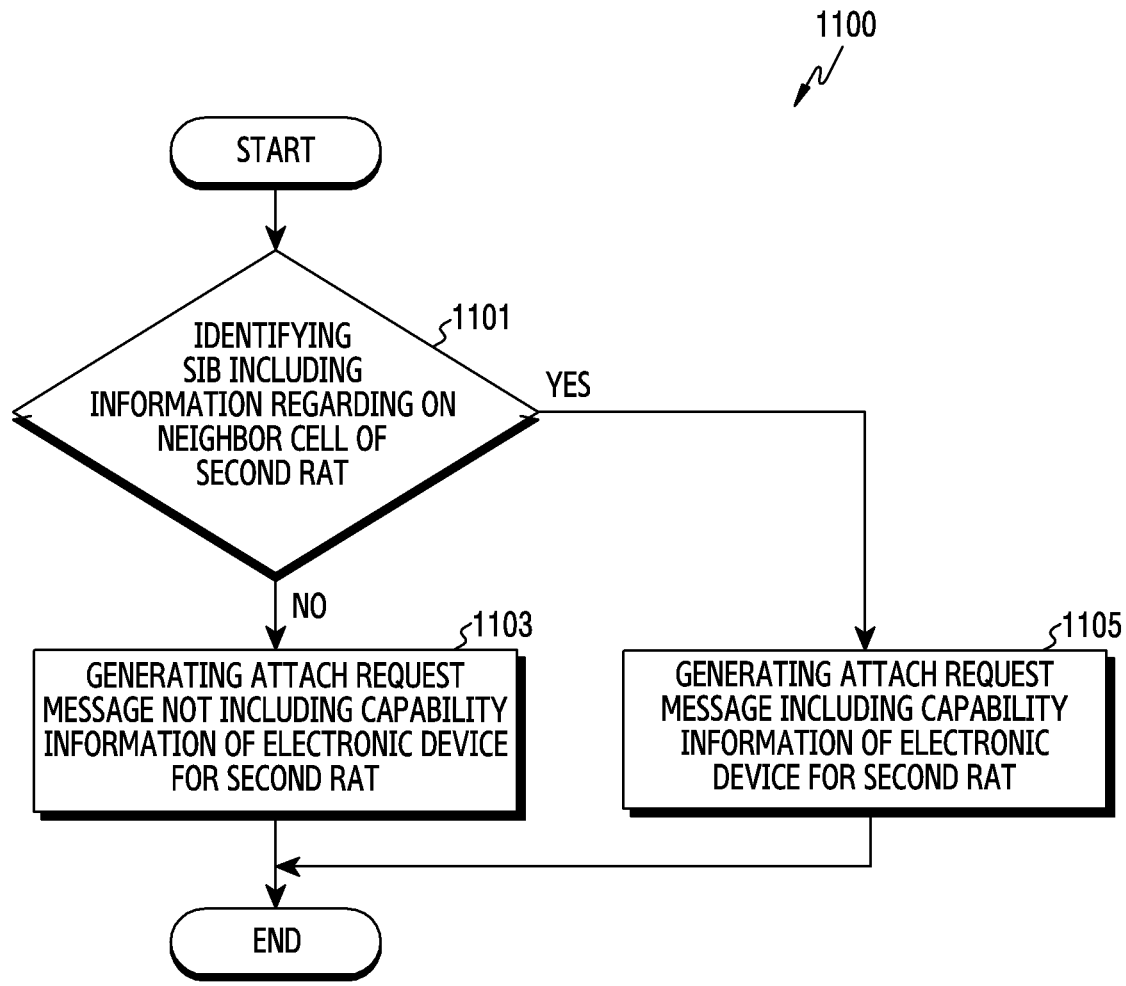
FIG. 11 illustrates another example of an operation of an electronic device for transmitting capability information of the electronic device through a NAS entity according to various embodiments.

FIG. 11 illustrates another example of an operation of an electronic device for transmitting capability information of the electronic device through a NAS entity according to various embodiments of the present disclosure. The operations illustrated in the flowchart 1100 of FIG. 11 may be performed by the electronic device 101 shown in FIGS. 1 and 2 or the wireless communication module 192 of the electronic device 101. In FIG. 11, the RAT on which the communication between the electronic device 101 and the network is based may be a 3G RAT or a 2G RAT.

Operations 1101 to 1105 in FIG. 11 may be related to operation 603 in FIG. 6.

Referring to FIG. 11, according to an embodiment, in operation 1101, the electronic device 101 may determine whether system information includes information about a neighboring cell of the second RAT. For example, the electronic device 101 may determine whether SIB including information on a neighboring cell of the second RAT (for 3G RAT case) or SI (for 2G RAT case) is identified among the system information received from the cell of the first RAT. When the system information does not include information on the neighboring cell of the second RAT (1101—NO), the electronic device 101 may perform operation 1103. Alternatively, when the system information includes information about a neighboring cell of the second RAT (1101—Yes), the electronic device 101 may perform operation 1105.

According to an embodiment, in operation 1103, the electronic device 101 may generate an Attach Request message that does not include capability information of the electronic device 101 for the second RAT (e.g., information on the security capability of the electronic device 101 for the second RAT). Furthermore, the electronic device 101 may transmit the generated Attach Request message or TAU Request message. For example, when system information does not include information on a neighboring cell of the second RAT, the electronic device 101 may transmit the Attach Request message that does not include capability information of the electronic device 101 for the second RAT during connecting to or initial access to the network.

According to an embodiment, in operation 1105, the electronic device 101 may generate an Attach Request message including capability information of the electronic device 101 for the second RAT (e.g., information on the security capability of the electronic device 101 for the second RAT). Furthermore, the electronic device 101 may transmit the generated Attach Request message or TAU Request message. For example, when system information includes information on a neighboring cell of the second RAT, the electronic device 101 may transmit the Attach Request message including capability information of the electronic device 101 for the second RAT during connecting to or initial access to the network.

Figure 12:
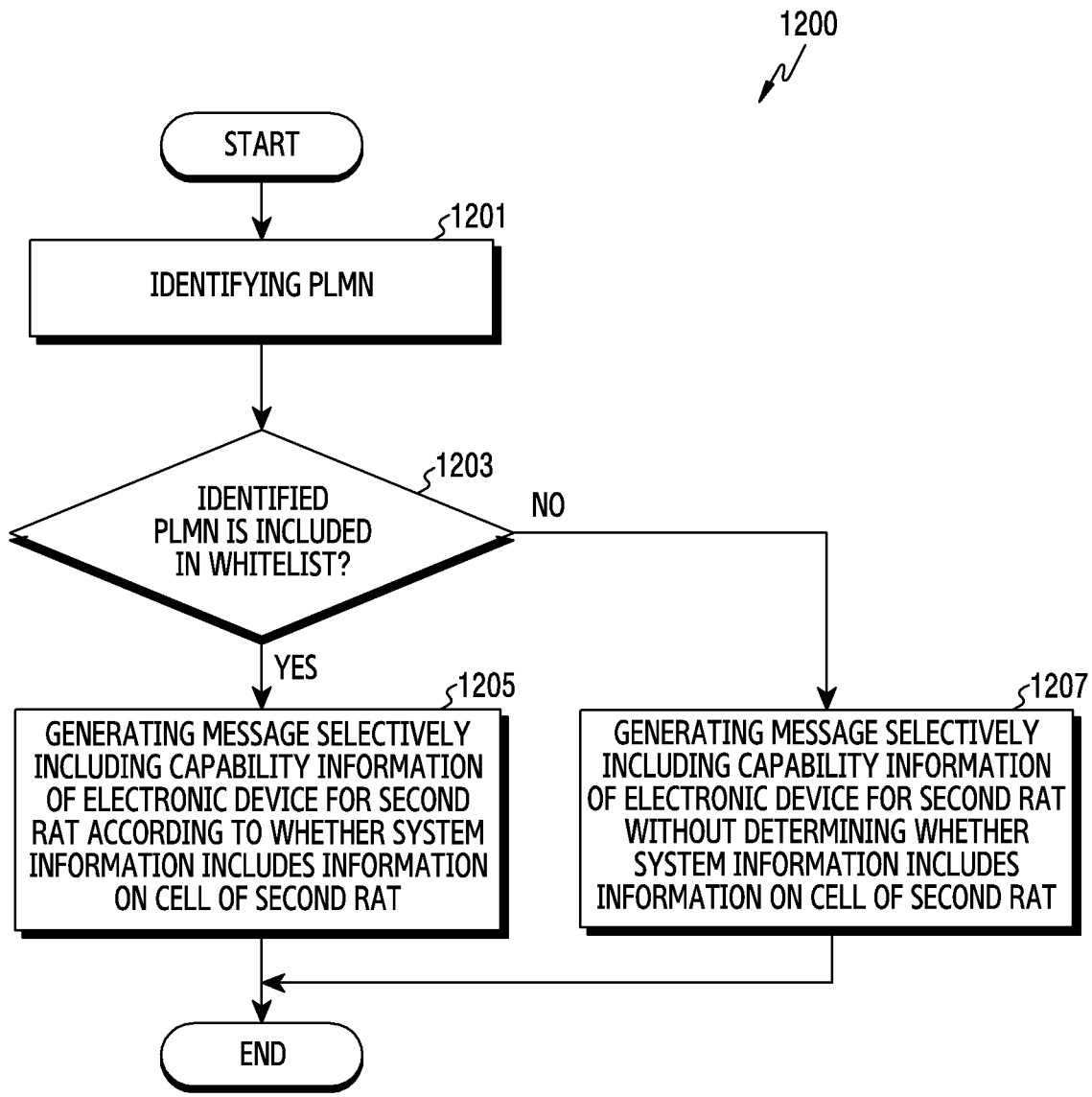
FIG. 12 illustrates an example of an operation of an electronic device for selectively transmitting capability information of the electronic device for a second RAT based on a public land mobile network (PLMN) according to various embodiments.

FIG. 12 illustrates an example of an operation of an electronic device for selectively transmitting capability information of the electronic device for a second RAT based on a public land mobile network (PLMN) according to various embodiments. The operations illustrated in the flowchart 1200 of FIG. 12 may be performed by the electronic device 101 shown in FIGS. 1 and 2 or the wireless communication module 192 of the electronic device 101.

Referring to FIG. 12, according to an embodiment, in operation 1201, the electronic device 101 may identify a PLMN. In various embodiments, the PLMN identified by the processor 120 may include at least one of a PLMN associated with a cell of the first RAT, or a home PLMN (HPLMN) registered a subscriber identity module (SIM) of the electronic device 101 (e.g., the subscriber identity module 196). In other words, the electronic device 101 may identify the PLMN associated with the cell of the first RAT and/or identify the HPLMN registered in the SIM of the electronic device 101. In various embodiments, the cell of the first RAT may be a cell in which the electronic device 101 is camping.

According to an embodiment, in operation 1203, the electronic device 101 may determine whether the identified PLMN belongs to a whitelist. The whitelist may be stored in the memory 130 of the electronic device 101. If the identified PLMN belongs to the whitelist (1203—Yes), the electronic device 101 may perform operation 1205. Alternatively, if the identified PLMN does not belong to the whitelist (1203—No), the electronic device 101 may perform operation 1207.

According to an embodiment, in operation 1205, the electronic device 101 generates a message selectively including capability information of the electronic device for the second RAT according to whether the system information includes information about a cell of a second RAT. For this, the electronic device 101 may determine whether the system information includes information about a cell of the second RAT. For example, when the system information received from the cell of the first RAT does not include information on the cell of the second RAT, the electronic device 101 may generate a message that does not include capability information of the electronic device 101 for the second RAT (e.g., a UECapabilityInformation message, an RRCConnectionSetupComplete message, a Classmark Change message, an Attach Request message, and/or a TAU request message), and transmit the generated message to the cell of the first RAT. As another example, when the system information received from the cell of the first RAT includes information on the cell of the second RAT, the electronic device 101 may generate a message that does not include capability information of the electronic device 101 for the second RAT (e.g., a UECapabilityInformation message, an RRCConnectionSetupComplete message, a Classmark Change message, an Attach Request message, and/or a TAU request message), and transmit the generated message to the cell of the first RAT.

According to an embodiment, in operation 1207, the electronic device 101 may generate a message including capability information of the electronic device for the second RAT without determining whether the system information includes information about the cell of the second RAT. In other words, when the identified PLMN does not belong to the whitelist, the electronic device 101 does not determine whether the system information includes information about the cell of the second RAT, and regardless of whether the system information includes information about the cell of the second RAT may generate a message including capability information of the electronic device 101 for the second RAT (e.g., a UECapabilityInformation message, an RRCConnectionSetupComplete message, a Classmark Change message, an Attach Request message, and/or a TAU request message). Furthermore, the electronic device 101 may transmit the generated message to the cell of the first RAT.

In various embodiments, the whitelist may include at least one PLMN that does not support the second RAT. At least one PLMN that does not support the second RAT may be preset in a whitelist (pre-configured) or dynamically configured according to a user's input. As another example, at least one PLMN that does not support the second RAT may be downloaded from a server (e.g., the server 108).

In various embodiments, the whitelist may include at least one PLMN in which the frequency of failed access attempts of the electronic device 101 is less than or equal to a threshold frequency. The electronic device 101 may transmit a message including the capability information of the electronic device 101 for the second RAT to the cell of the PLMN in the process of accessing the PLMN, and if the electronic device 101 may try to access the PLMN several times, the number of times that the electronic device 101 fails to access the PLMN (or the number of times that access attempt fails) compared to the number of times that the electronic device 101 attempts to access the PLMN may be determined. The electronic device 101 may compare the frequency (number) of failed access attempts to the PLMN with a threshold frequency, and when the frequency of failed access attempts is less than or equal to the threshold frequency, the electronic device 101 may store the PLMN in a whitelist. As another example, the electronic device 101 may transmit to the network the number of times the device 101 has attempted to access the PLMN, the number of times the electronic device 101 has failed to access the PLMN, and/or the frequency of failed access attempts. The network may determine the frequency of failed access attempts, and when the frequency of failed access attempts is less than or equal to a threshold frequency, the network may set such a PLMN in the whitelist of the electronic device 101. In various embodiments, the threshold frequency may be preset in the memory 130, flexibly set according to a user's input, or set by a network.

In FIG. 12, the electronic device 101 may determine whether the PLMN identified in operation 1203 belongs to the whitelist.

If the identified PLMN belongs to the whitelist, in operation 1205, the electronic device 101 may determine whether the system information includes information about the cell of the second RAT. However, this is an example, and various modifications are possible. For example, when the identified PLMN does not belong to the whitelist, the electronic device 101 may determine whether the system information includes information about a cell of the second RAT. According to the result of the determination, the electronic device 101 may generate a message selectively including the capability information of the electronic device 101 for the second RAT. Contrary to this, when the identified PLMN belongs to the whitelist, the electronic device 101 does not determine whether the system information includes information about the cell of the second RAT, and may generate a message not including capability information of the electronic device 101 for the second RAT regardless of whether the system information includes information about the cell of the second RAT.

Figure 13:
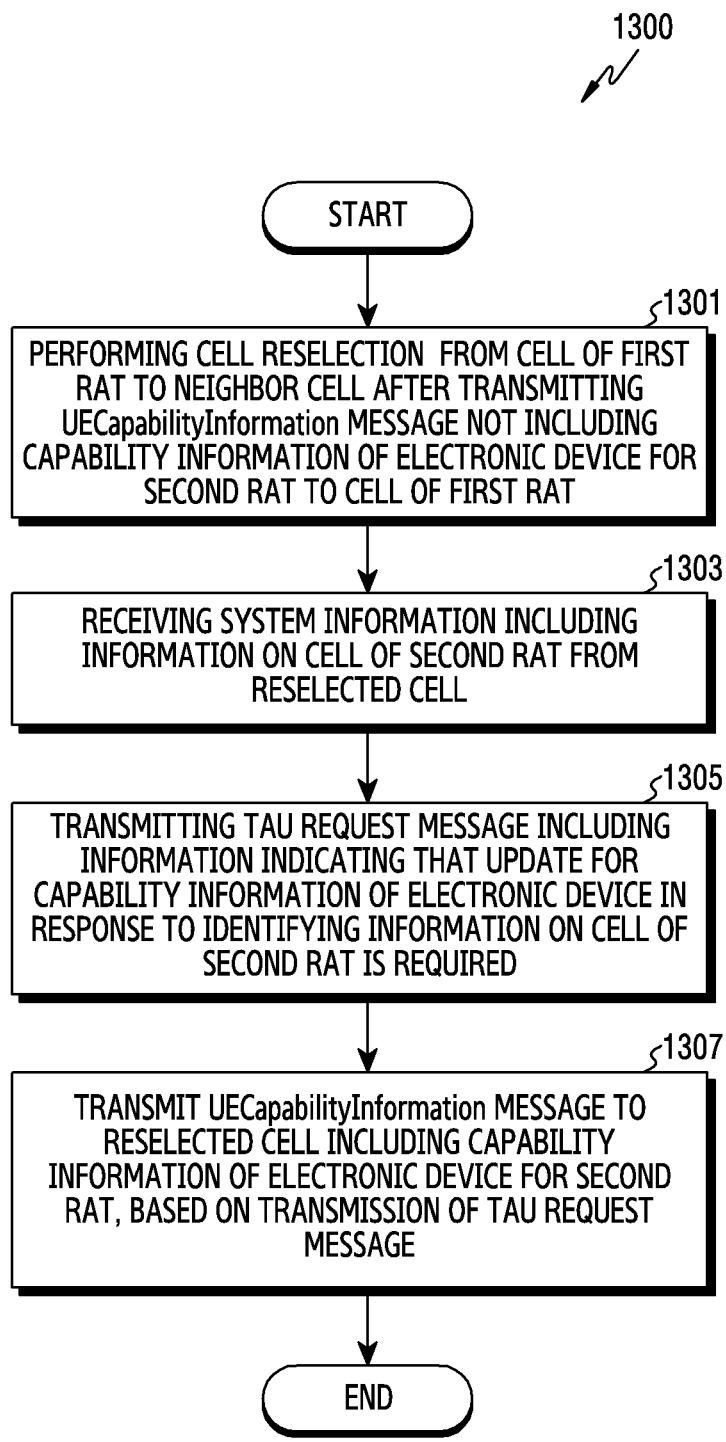
FIG. 13 illustrates an example of an operation of an electronic device for indicating that an update of capability information of the electronic device is required after cell reselection according to various embodiments.

FIG. 13 illustrates an example of an operation of an electronic device for indicating that an update of capability information of the electronic device is required after cell reselection according to various embodiments of the present disclosure. The operations illustrated in the flowchart 1300 of FIG. 13 may be performed by the electronic device 101 illustrated in FIGS. 1 and 2 or the wireless communication module 192 of the electronic device 101.

Referring to FIG. 13, according to an embodiment, in operation 1301, the electronic device 101 transmits a UECapabilityInformation message that does not include capability information of the electronic device 101 for the second RAT to the cell of the first RAT, the electronic device 101 may perform cell reselection from a cell of the first RAT to a neighboring cell. For example, the base station associated with the cell of the first RAT may not support the second RAT. After accessing the cell of the first RAT, the electronic device 101 compares the signal strength of the signal received from the cell of the first RAT with the signal strength of the signal received from the neighboring cell, and based on the comparison result, the cell to the neighboring cell reselection can be performed. For example, a signal strength of a signal received from a neighboring cell is greater than a signal strength of a signal received from a cell of the first RAT by an offset or more, or a signal strength of a signal received from a neighboring cell is greater than or equal to the first offset, and when the signal strength of a signal received from a cell of the first RAT is equal to or less than the second offset, the electronic device 101 may perform cell reselection to a neighboring cell.

According to an embodiment, in operation 1303, the electronic device 101 may receive system information including information about a cell of the second RAT from the reselected cell. For example, the electronic device 101 may receive SIB2 including upperLayerIndication from the cell from which the electronic device 101 is reselected, and/or may receive SIB including information about a neighboring cell of the second RAT. In response to receiving system information including information about a cell of the second RAT from the reselected cell, the electronic device 101 may determine that the base station associated with the reselected cell can support the second RAT.

According to an embodiment, in operation 1305, in response to identifying information about the cell of the second RAT in the system information received from the reselected cell, the electronic device 101 may transmit a TAU Request message including information indicating that an update of the capability information of the electronic device 101 is required. The electronic device 101 may transmit the TAU Request message including information indicating that an update of the capability information of the electronic device 101 is requested through the NAS entity to a mobility management entity (MME) of a network related to the cell of the second RAT. For example, the TAU Request message may include, as information indicating that an update of the capability information of the electronic device 101 is requested, an information element (IE) 'UE radio capability information update needed'. In various embodiments, the IE 'UE radio capability information update needed' may indicate whether the MME should delete capability information (e.g., UE radio capability information) of the electronic device 101 stored in the MME. Since the electronic device 101 has transmitted the UECapabilityInformation message that does not include the capability information of the electronic device 101 for the second RAT before performing cell reselection, the MME may store UE radio capability information that does not include capability information of the electronic device 101 for the second RAT. However, when the electronic device 101 performs cell reselection to a cell associated with a base station capable of supporting the second RAT, the electronic device 101 determines that an update of the UE radio capability information stored in the MME is required, and through NAS entity, transmits a TAU request message including an IE 'UE radio capability information update request' indicating that MME should delete the UE radio capability information stored in the MME to the MME.

According to an embodiment, in operation 1307, based on the transmission of the TAU request message, the electronic device 101 may transmit a UECapabilityInformation message including capability information of the electronic device 101 for the second RAT to the reselected cell. Since the electronic device 101 has transmitted the TAU request message including information indicating that the update of the capability information of the electronic device 101 is requested, the electronic device 101 may transmit the updated capability information (e.g., UECapabilityInformation message including the capability information of the electronic device 101 for the second RAT) to the neighboring cell. In response to the MME receiving the TAU request message including information indicating that the update of the capability information of the electronic device 101 is requested (e.g., a TAU request message including an IE 'UE radio capability information update request' indicating that MME should delete the UE radio capability information stored in the MME), the MME may delete UE radio capability information that does not include capability information of the electronic device 101 for the second RAT pre-stored in the MME, and after receiving information corresponding to UECapabilityInformation in operation 1307, store UE radio capability information including capability information of the electronic device 101 for the second RAT.

In FIG. 13, a case in which the electronic device 101 performs cell reselection from a cell associated with a base station that cannot support the second RAT to a cell associated with a base station that can support the second RAT has been described. However, various embodiments may also be applied when the electronic device 101 performs cell reselection from a cell associated with a base station capable of supporting the second RAT to a cell associated with a base station that cannot support the second RAT. In this case, since the electronic device 101 transmitted the UECapabilityInformation message including the capability information of the electronic device 101 for the second RAT before performing cell reselection, the MME may store the UE radio capability information including the capability information of the electronic device 101 for the second RAT. After the electronic device 101 performs cell reselection to a cell associated with a base station that cannot support the second RAT, the electronic device 101 may determine that an update of the UE radio capability information stored in the MME is required, and the electronic device 101 may transmit a TAU request message including an IE 'UE radio capability information update request' indicating that the MME should delete the UE radio capability information stored in the MME through the NAS entity to the MME. In response to receiving the TAU request message including information indicating that the update of the capability information of the electronic device 101 is requested (e.g., an IE 'UE radio capability information update request indicating that the MME should delete the UE radio capability information stored in the MME), the MME may delete UE radio capability information including capability information of the electronic device 101 for the second RAT previously stored in the MME, and after receiving information corresponding to the UECapabilityInformation (does not include capability information of the electronic device 101 for the second RAT) transmitted by the electronic device 101 to the reselected cell, may store UE radio capability information that does not include capability information of the electronic device 101 for the second RAT.

In FIG. 13, an example of a case in which the electronic device 101 performs cell reselection from a cell of the first RAT to a neighboring cell has been described, but examples described in FIG. 13 may also be applied when the electronic device 101 performs handover from a cell of the first RAT to a neighboring cell.

Figure 14:
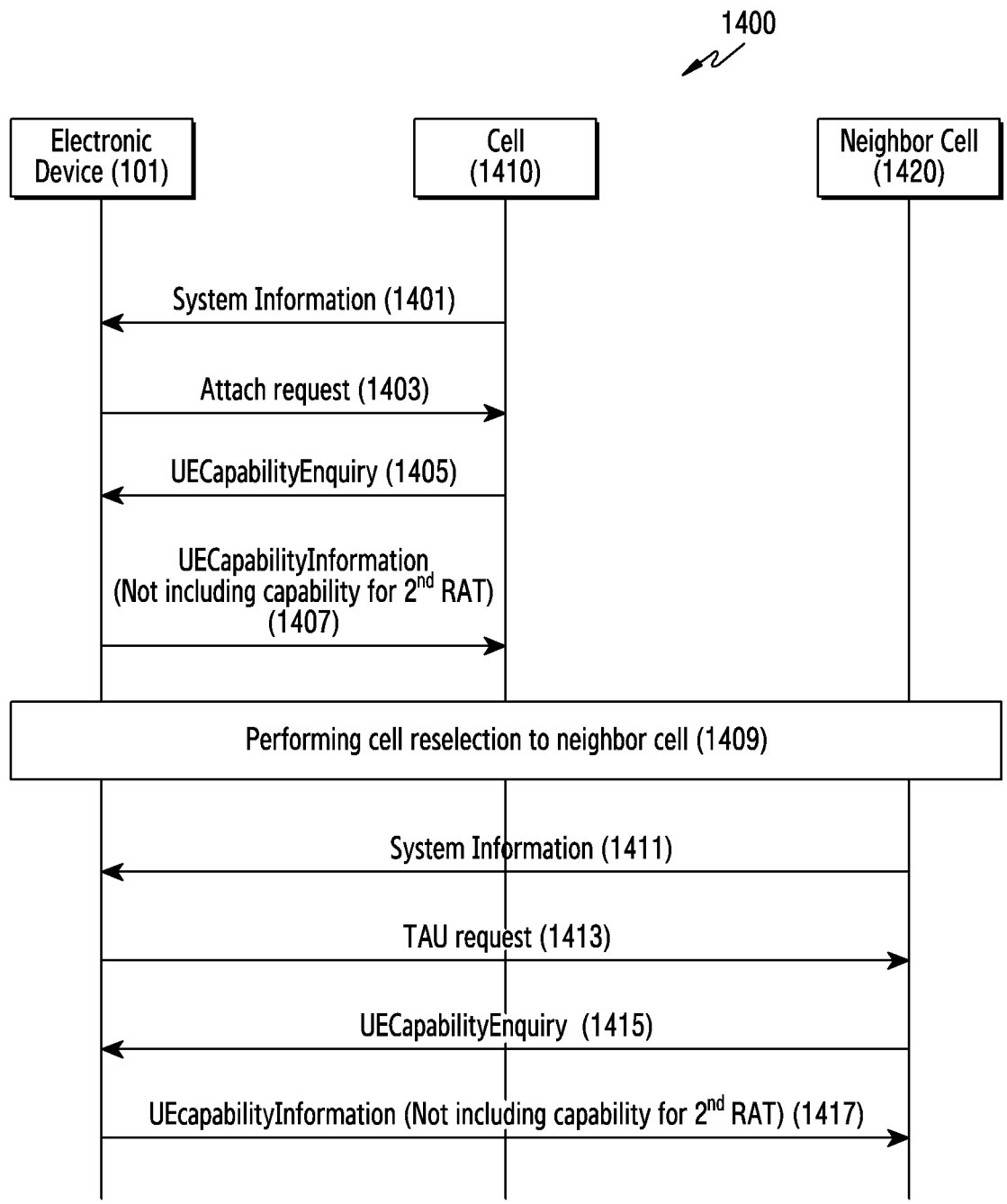
FIG. 14 illustrates an example of a signal flow between an electronic device and a network for indicating that an update of capability information of the electronic device is required after cell reselection according to various embodiments.

FIG. 14 illustrates an example of a signal flow between an electronic device and a network for indicating that an update of capability information of the electronic device is required after cell reselection according to various embodiments of the present disclosure. In the signal flow 1400 of FIG. 14, it is assumed that the base station associated with the cell 1310 cannot support the second RAT, and the base station associated with the cell 1320 can support the second RAT.

Referring to FIG. 14, according to an embodiment, in operation 1401, the cell 1310 may transmit system information to the electronic device 101, and the electronic device 101 may receive the system information from the cell 1310. Since the base station associated with the cell 1310 cannot support the second RAT, the system information in operation 1401 may not include information about the cell of the second RAT. For example, SIB2 received by the electronic device 101 may not include upperLayerIndication, and any SIB received by the electronic device 101 may not include information about a neighboring cell of the second RAT.

According to an embodiment, in operation 1403, the electronic device 101 may transmit an Attach Request to the cell 1310, and the cell 1310 may receive an Attach Request from the electronic device 101. The cell 1310 Attach Request message may be used to request an access to the base station 510 and may include an identifier such as an IMSI. In various embodiments, the electronic device 101 may determine that the base station associated with the cell 1310 does not support the second RAT based on the system information received in operation 1401. Accordingly, an Attach Request message that does not include information (e.g., additional UE security information) regarding the security capability of the electronic device 101 for the second RAT may be transmitted to the cell 1310.

According to an embodiment, in operation 1405, the cell 1310 may transmit a UECapabilityEnquiry message to the electronic device 101, and the electronic device 101 may receive a UECapabilityEnquiry message from the cell 1310. Cell 1310 In various embodiments, the UECapabilityEnquiry message may be used to request that the electronic device 101 transmit capability information of the electronic device 101 to the cell 1310.

According to an embodiment, in operation 1407, the electronic device 101 may transmit a UECapabilityInformation message to the cell 1310, and the cell 1310 may receive a UECapabilityInformation message from the electronic device 101. Cell 1310 Since the base station associated with the cell 1310 cannot support the second RAT, the UECapabilityInformation message may not include capability information of the electronic device 101 for the second RAT. Although not shown, the cell 1310 may deliver information corresponding to the UECapabilityInformation message that does not include the capability information of the electronic device 101 for the second RAT to the MME, and the MME may store UE radio capability information that does not include capability information of the electronic device 101 for the second RAT according to the transmitted information.

According to an embodiment, in operation 1409, the electronic device 101 may perform cell reselection from the cell 1310 to the cell 1320 that is a neighboring cell.

After accessing the cell of the first RAT, the electronic device 101 may compare the signal strength of the signal received from the cell 1310 with the signal strength of the signal received from the cell 1320, and based on the comparison result, may perform cell reselection to the cell 1320. For example, a signal strength of a signal received from cell 1320 is greater than a signal strength of a signal received from cell 1310 by an offset or greater, or a signal strength of a signal received from cell 1320 is greater than or equal to a first offset and the signal strength of the signal received from the cell 1310 is equal to or less than the second offset, the electronic device 101 may perform cell reselection to the cell 1320.

According to an embodiment, in operation 1411, the cell 1320 may transmit system information to the electronic device 101, and the electronic device 101 may receive system information from the cell 1320. For example, the electronic device 101 may receive system information from the cell 1320. Since the base station associated with the cell 1320 may support the second RAT, the system information in operation 1411 may include information about the cell of the second RAT. For example, SIB2 received by the electronic device 101 may include upperLayerIndication, and at least one SIB received by the electronic device 101 may include information about a neighboring cell of the second RAT.

According to an embodiment, in operation 1413, the electronic device 101 may transmit a TAU request to the cell 1320, and the cell 1320 may receive the TAU request from the electronic device 101. For example, the electronic device 101 of the electronic device 101 may transmit a TAU Request message to the cell 1320. In various embodiments, the TAU Request message may include information indicating that an update of the capability information of the electronic device 101 is requested. For example, the TAU Request message may include an IE 'UE radio capability information update request' as information indicating that an update of the capability information of the electronic device 101 is requested. The IE 'UE radio capability information update request' may indicate that the MME should delete the UE radio capability information stored in the MME. In more detail, when the electronic device 101 performs cell reselection to the cell 1320 associated with the base station capable of supporting the second RAT, the electronic device 101 may determine that the update of the UE radio capability information stored in the MME is required, and may transmit to the MME a TAU request message including an IE 'UE radio capability information update request' indicating that the MME should delete the UE radio capability information stored in the MME through the NAS entity.

According to an embodiment, in operation 1415, the cell 1320 may transmit a UECapabilityEnquiry message to the electronic device 101, and the electronic device 101 may receive a UECapabilityEnquiry message from the cell 1320. For example, the electronic device 101 of the electronic device 101 may receive a UECapabilityEnquiry message from the cell 1320. In various embodiments, the UECapabilityEnquiry message may be used to request that the electronic device 101 transmit the capability information of the electronic device 101 to the cell 1320.

According to an embodiment, in operation 1417, the electronic device 101 may transmit a UECapabilityInformation message to the cell 1320, and the cell 1320 may receive a UECapabilityInformation message from the electronic device 101. For example, the electronic device 101 of the electronic device 101 may transmit a UECapabilityInformation message to the cell 1320 in response to reception of the UECapabilityInformation message. Since the base station associated with the cell 1320 may support the second RAT, the UECapabilityInformation message may include capability information of the electronic device 101 for the second RAT. The electronic device 101 transmits a TAU request message including information indicating that an update of the capability information of the electronic device 101 is requested in operation 1413, and then in operation 1415 the electronic device 101 may transmit the updated capability information (e.g., the UECapabilityInformation message including capability information of the electronic device 101 for the second RAT) to the cell 1320. Although not shown, the cell 1320 may deliver information corresponding to the UECapabilityInformation message including the capability information of the electronic device 101 for the second RAT to the MME, and the MME may store UE radio capability information including capability information of the electronic device 101 for the second RAT according to the transmitted information.

In FIG. 14, an example of a case in which the electronic device 101 performs cell reselection from a cell of the first RAT to a neighboring cell has been described, but examples described in FIG. 14 may also be applied when the electronic device 101 performs handover from a cell of the first RAT to a neighboring cell.

Figure 15:
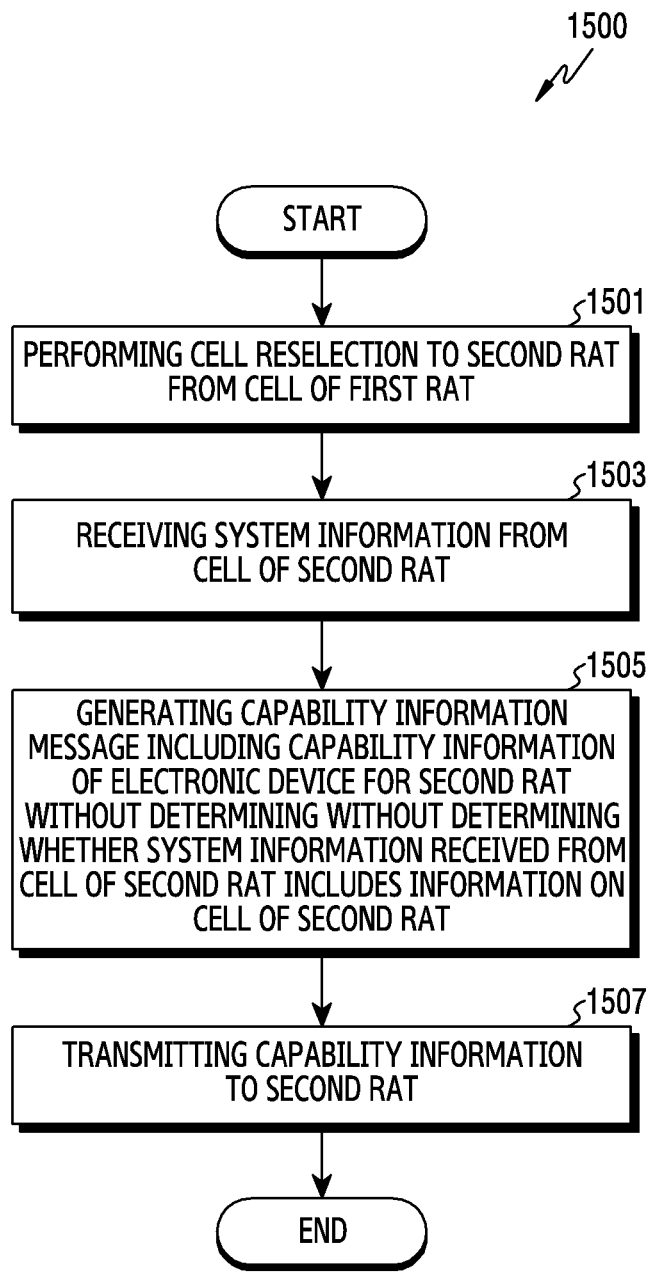
FIG. 15 illustrates an example of an operation of an electronic device for transmitting capability information of the electronic device after cell reselection to a cell of a second RAT according to various embodiments.

FIG. 15 illustrates an example of an operation of an electronic device for transmitting capability information of the electronic device after cell reselection to a cell of the second RAT according to various embodiments. The operations illustrated in the flowchart 1500 of FIG. 15 may be performed by the electronic device 101 shown in FIGS. 1 and 2 or the wireless communication module 192 of the electronic device 101.

Referring to FIG. 15, according to an embodiment, in operation 1501, the electronic device 101 may perform cell reselection from a cell of a first RAT to a cell of a second RAT. For example, the electronic device 101 may identify the cell of the second RAT from the list of neighboring cells included in the system information previously received from the cell of the first RAT, and may perform reselection to the cell as the identified cell of the second RAT. Since the electronic device 101 identifies and selects the cell of the second RAT by itself, the electronic device 101 can know that the base station related to the cell after the cell reselection can support the second RAT.

According to an embodiment, in operation 1503, the electronic device 101 may receive system information from a cell of the second RAT. Since the base station related to the cell of the second RAT can support the second RAT, the system information received from the cell of the second RAT may include information about the cell of the second RAT (e.g., information about the neighboring cell of the second RAT).

According to an embodiment, in operation 1505, without determining whether the system information received from the cell of the second RAT includes information about the cell of the second RAT, the electronic device 101 may generate a capability information message including capability information of the device 101 for the second RAT. Since the electronic device 101 knows that the base station related to the cell of the second RAT can support the second RAT before cell reselection, without the system information received from the cell of the second RAT includes information about the cell of the RAT, the electronic device 101 may generate a capability information message including capability information of the electronic device 101 for the second RAT. For example, the electronic device 101 determines whether the system information received from the cell of the first RAT includes information about the cell of the second RAT before cell reselection, and the electronic device 101 may omit the determination of whether the system information received from the reselected cell includes information about the cell of the second RAT based on the result of the determination. In various embodiments, the capability information message may include, as a message that may include capability information of the electronic device 101 for a specific RAT, at least of one of a UECapabilityInformation message, an RRCConnectionSetupComplete message, a Classmark Change message, an Attach Request message, or a TAU Request message.

According to an embodiment, in operation 1507, the electronic device 101 may transmit the capability information message to the cell of the second RAT. For example, the electronic device 101 may transmit a UECapabilityInformation message including capability information of the electronic device 101 for the second RAT to the cell of the second RAT in response to the UECapabilityEnquiry message received from the cell of the second RAT. As another example, the electronic device 101 may transmit an RRC- ConnectionSetupComplete message including capability information of the electronic device 101 for the second RAT to the cell of the second RAT in a process in which the electronic device 101 establishes an RRC connection with the network. As another example, the electronic device 101 may transmit a Classmark Change message including capability information of the electronic device 101 for the second RAT to the cell of the second RAT. As another example, the electronic device 101 may transmit an Attach Request message including capability information of the electronic device 101 for the second RAT to the cell of the second RAT during the connection or initial access of the electronic device 101 to the network. As another example, the electronic device 101 may transmit a TAU Request message including capability information of the electronic device 101 for the second RAT in a situation in which the update of the tracking area is required as the electronic device 101 moves, to the second RAT.

In FIG. 15, an example of a case in which the electronic device 101 performs cell reselection from a cell of the first RAT to a cell of the second RAT has been described, but examples described in FIG. 15 may also be applied when the electronic device 101 performs handover from a cell of the first RAT to a cell of the second RAT.

Figure 16:
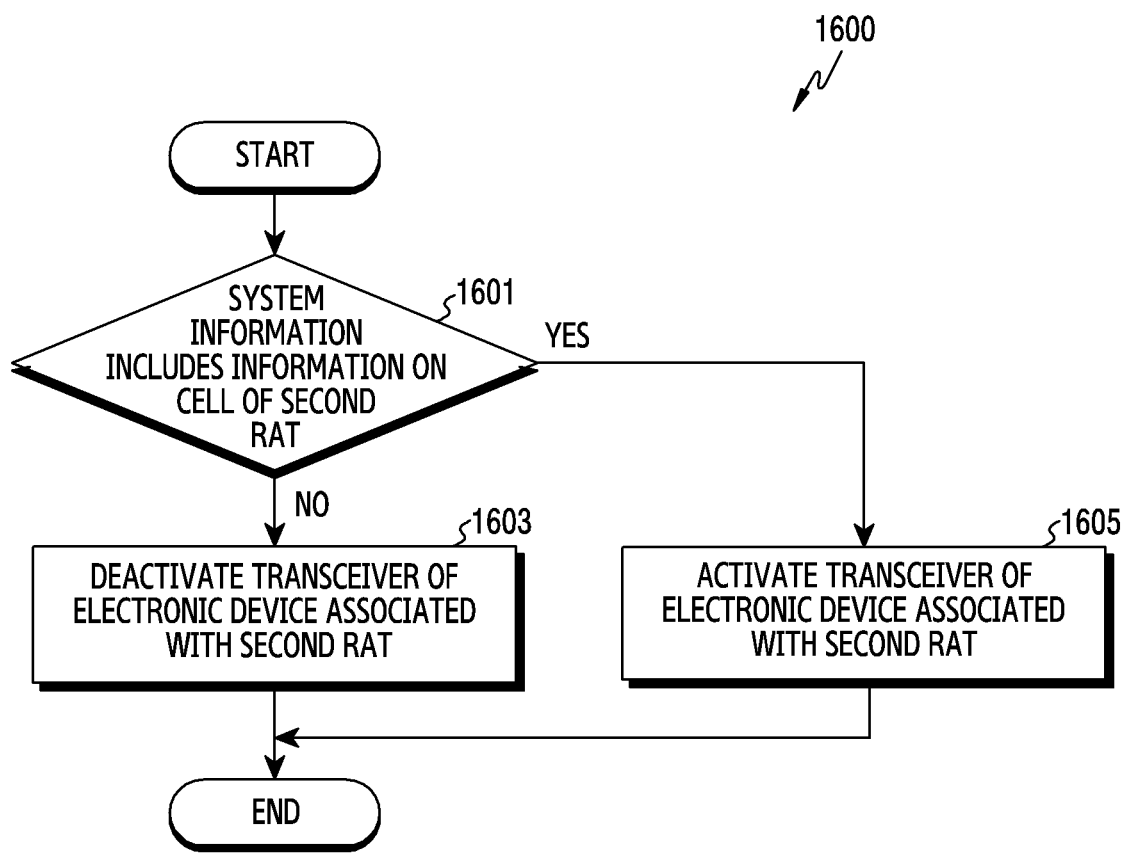
FIG. 16 illustrates an example of an operation of an electronic device for controlling power to a transceiver of an electronic device related to a second RAT according to various embodiments.

FIG. 16 illustrates an example of an operation of an electronic device for controlling power to a transceiver of an electronic device related to a second RAT according to various embodiments of the present disclosure. The operations illustrated in the flowchart 1600 of FIG. 16 may be performed by the electronic device 101 shown in FIGS. 1 and 2 or the wireless communication module 192 of the electronic device 101.

Operations 1601 to 1605 of FIG. 16 may be related to operation 603 of FIG. 6.

Referring to FIG. 16, according to an embodiment, in operation 1601, the electronic device 101 may determine whether system information includes information about a cell of the second RAT. For example, the electronic device 101 determines whether the SIB2 received from the cell of the first RAT includes upperLayerIndication, and may determine whether the system information received from the cell of the first RAT includes information about the neighboring cell of the second RAT. When the system information received from the cell of the first RAT does not include information about the cell of the second RAT, the electronic device 101 may perform operation 1603. Alternatively, when the system information received from the cell of the first RAT includes information about the cell of the second RAT, the electronic device 101 may perform operation 6051705.

According to an embodiment, in operation 1603, the electronic device 101 may deactivate the transceiver (e.g., the second communication processor 214) of the electronic device 101 associated with the second RAT. For example, when the system information received from the cell of the first RAT does not include information about the cell of the second RAT, the electronic device 101 may decide that the base station related to the cell of the first RAT does not support the second RAT. The electronic device 101 may deactivate the transceiver of the electronic device 101 related to the second RAT or cut off power to the transceiver of the electronic device 101 related to the second RAT. In this case, the electronic device 101 may communicate with the cell of the first RAT using a transceiver (e.g., the first communication processor 212) of the electronic device 101 related to the first RAT.

According to an embodiment, in operation 1605, the electronic device 101 may activate the transceiver of the electronic device 101 related to the second RAT. For example, when the system information received from the cell of the first RAT includes information about the cell of the second RAT, the electronic device 101 may decide that the base station related to the cell of the first RAT may support the second RAT, and the electronic device 101 may activate the transceiver related to the second RAT, or may supply power to the transceiver of related to the second RAT. In this case, while the electronic device 101 communicates with the cell of the first RAT using the transceiver of the electronic device 101 related to the first RAT, and the electronic device 101 may communicate with a cell of the second RAT using the transceiver of the electronic device 101 related to the second RAT or may prepare for communication with a cell of the second RAT.

In various embodiments, in a state in which the transceiver of the electronic device 101 related to the second RAT is inactivated, the electronic device 101 may decide that the system information received from the first RAT does not include the information about the cell of the second RAT. In this case, operation 1603 may be omitted.

In various embodiments, in a state in which the transceiver of the electronic device 101 related to the second RAT is activated, the electronic device 101 may decide that the system information received from the first RAT includes the information about the cell of the second RAT. In this case, operation 1605 may be omitted.

As illustrated in FIG. 16, the electronic device 101 may reduce unnecessary power consumption by controlling the active state of the transceiver of the electronic device 101 related to the second RAT according to whether the base station can support the second RAT.

As described above, the method for operating an electronic device (e.g., the electronic device 101) according to various embodiments may comprise receiving system information from a cell of a first radio access technology (RAT); generating a message selectively including capability information of the electronic device for the second RAT according to whether the system information includes information about a cell of a second RAT different from the first RAT; and transmitting the message to the cell of the first RAT.

In various embodiments, wherein the information on the cell of the second RAT, includes at least one of information indicating that a base station related to the cell of the first RAT supports the second RAT, or information on a neighbor cell of the second RAT, and wherein the capability information of the electronic device for the second RAT includes at least one of information on capability of the electronic device indicating that connection to the cell of the first RAT and the cell of the second RAT is possible, information on capability of the electronic device for access to the first RAT and the second RAT, or information on security capability of the electronic device for the second RAT.

In various embodiments, wherein generating the message selectively including capability information of the electronic device for the second RAT may include determining whether the system information includes information about a cell of the second RAT; and generating the message not including capability information of the electronic device for the second RAT in response to a determination that the system information does not include information about a cell of the second RAT, and wherein the message includes UECapabilityInformation message, RRCConnectionSetupComplete message, a Classmark Change message, an Attach Request message, or a tracking area update (TAU) request message.

In various embodiments, wherein the information on the cell of the second RAT includes an upper layer indicator (upperLayerIndication) indicating that the base station related to the cell of the first RAT supports the second RAT, wherein generating a message selectively including capability information of the electronic device for the second RAT includes: determining whether SIB2 (SystemInformationBlockType2) among the system information includes the upperLayerIndication; and generating a UECapabilityInformation message that does not include capability information of the electronic device for the second RAT in response to determining that the SIB2 does not include the upperLayerIndication.

In various embodiments, wherein the information on the cell of the second RAT includes information about a neighbor cell of the second RAT, wherein generating a message selectively including capability information of the electronic device for the second RAT includes: determining whether a system information block (SIB) including information on the neighboring cell of the second RAT is identified among the system information; and in response to determining that the SIB is not identified, generating the message not including capability information of the electronic device for the second RAT; wherein the message is UECapabilityInformation message, or a RRCConnectionSetupComplete message.

In various embodiments, wherein the information on the cell of the second RAT includes information about a neighbor cell of the second RAT, wherein generating a message selectively including capability information of the electronic device for the second RAT includes: determining whether system information (SI) including information on a neighboring cell of the second RAT from among the system information is identified; and generating a Classmark Change message that does not include capability information of the electronic device for the second RAT in response to determining that the SI is not identified.

In various embodiments, wherein the information on the cell of the second RAT includes at least one of an upper layer indicator (upperLayerIndication) indicating that the base station related to the cell of the first RAT supports the second RAT or information on a neighboring cell of the second RAT, wherein generating a message selectively including capability information of the electronic device for the second RAT includes: determining whether a system information block SIB including at least one of the upperLayerIndication and information on a neighboring cell of the second RAT is identified from among the system information; and in response to determining that the SIB is not identified, generating the message not including capability information of the electronic device for the second RAT; wherein the message is an Attach Request message, or a TAU request message In various embodiments, wherein the information on the cell of the second RAT includes information on a neighboring cell of the second RAT, wherein generating a message selectively including capability information of the electronic device for the second RAT includes: determining whether the system information includes information about a neighboring cell of the second RAT; and generating an attach request message that does not include capability information of the electronic device for the second RAT in response to a determination that the system information does not include information on the neighboring cell of the second RAT.

In various embodiments, the method may further comprise identifying a PLMN including at least one of a public land mobile network (PLMN) associated with the cell of the first RAT or a home PLMN (HPLMN) registered in a subscriber identity module (SIM) of the electronic device; determining whether the identified PLMN belongs to a whitelist stored in a memory of the electronic device; generating a message selectively including capability information of the electronic device for the second RAT includes, in response to determining that the identified PLMN belongs to the whitelist, determining whether the system information includes information about a cell of the second RAT, and wherein the whitelist includes at least one PLMN that does not support the second RAT or a number of failed access attempts of the electronic device is less than or equal to a threshold number.

In various embodiments, the method may further comprise after transmitting a UECapabilityInformation message that does not include capability information of the electronic device for the second RAT to the cell of the first RAT, performing cell reselection from the cell of the first RAT to a neighboring cell; receiving, from the reselected cell, system information including information about the cell of the second RAT; in response to identifying information on the cell of the second RAT in the system information received from the reselected cell, transmitting a TAU request message including information indicating that an update of the capability information of the electronic device is requested; and transmitting a UECapabilityInformation message including capability information of the electronic device for the second RAT to the reselected cell based on the transmission of the TAU request message.

In various embodiments, the method may further comprise performing cell reselection from the cell of the first RAT to the cell of the second RAT; receiving system information from the cell of the second RAT; without determining whether the system information received from the cell of the second RAT includes information about the cell of the second RAT, generating a capability information message including capability information of the electronic device for the second RAT; and transmitting the capability information message to the cell of the second RAT.

In various embodiments, wherein the message includes, regardless of whether the system information includes information about the cell of the second RAT, information indicating whether the electronic device supports EN-DC (EUTRA (evolved universal terrestrial radio access)-new radio dual connectivity) and frequency bands of the second RAT supported by the electronic device.

In various embodiments, wherein generating of the message selectively including the capability information of the electronic device for the second RAT comprises: determining whether the system information includes information on the cell of the second RAT; and deactivating a transceiver of the electronic device associated with the second RAT in response to determining that the system information does not include information about a cell of the second RAT.

In various embodiments, wherein the first RAT comprises one of LTE, WCDMA, TDSCMDA, or GSM, and the second RAT comprises NR (new radio).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

In various embodiments, the electronic device (e.g., electronic device 101) may be referred to as a terminal, user equipment, mobile station, subscriber station, remote terminal, wireless terminal, user device, or other terms having an equivalent technical meaning.

In various embodiments, a base station may be a network infrastructure that provides wireless access to the electronic device (e.g., electronic device 101), and the base station may be an access point, eNodeB, gNodeB, 5th generation node, wireless point, transmission/reception point, or other terms having an equivalent technical meaning.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method of operating an electronic device, comprising:
   receiving system information from a cell of a first radio access technology (RAT);
   identifying whether the system information includes information for a cell of a second RAT different from the first RAT;
   in case that the system information includes the information for the cell of the second RAT,
      generating a first message including capability information of the electronic device for the second RAT;
      supplying power to a transceiver related to the second RAT;
   in case that the system information does not include the information for the cell of the second RAT,
      generating a second message not including the capability information of the electronic device for the second RAT;
      cutting off the power to the transceiver related to the second RAT;
   transmitting the first message or the second message to the cell of the first RAT,
   wherein the capability information of the electronic device for the second RAT included in the first message includes a parameter for evolved universal terrestrial radio access (EUTRA) new radio dual connectivity (EN-DC) capability, a parameter for multi-RAT dual connectivity (MR-DC) capability, and information for a security capability of the electronic device for the second RAT,
   wherein both the first message and the second message include information indicating whether the electronic device supports EN-DC regardless of whether the system information includes the information for the cell of the second RAT.

2. The method according to claim 1, wherein the information on the cell of the second RAT, includes at least one of information indicating that a base station related to the cell of the first RAT supports the second RAT, or information on a neighbor cell of the second RAT, and
   wherein the capability information of the electronic device for the second RAT includes at least one of information on capability of the electronic device indicating that connection to the cell of the first RAT and the cell of the second RAT is possible, information on capability of the electronic device for access to the first RAT and the second RAT, or information on security capability of the electronic device for the second RAT.

3. The method according to claim 2,
   wherein generating the message selectively including capability information of the electronic device for the second RAT includes:
      determining whether the system information includes information about a cell of the second RAT; and
      generating the message not including capability information of the electronic device for the second RAT in response to a determination that the system information does not include information about a cell of the second RAT, and
   wherein the message includes UECapabilityInformation message, RRCConnectionSetupComplete message, a Classmark Change message, an Attach Request message, or a tracking area update (TAU) request message.

4. The method according to claim 1, wherein the message includes, regardless of whether the system information includes information about the cell of the second RAT, information indicating whether the electronic device supports EN-DC (EUTRA (evolved universal terrestrial radio access)-new radio dual connectivity) and frequency bands of the second RAT supported by the electronic device.

5. The method according to claim 1, wherein the first RAT comprises one of LTE, WCDMA, TDSCMDA, or GSM, and the second RAT comprises NR (new radio).

6. An electronic device, comprising:
   at least one transceiver; and
   at least one processor operatively coupled to at least one transceiver, wherein the at least one processor is configured to:
   receive system information from a cell of a first radio access technology (RAT);
   identify whether the system information includes information for a cell of a second RAT different from the first RAT;
   in case that the system information includes the information for the cell of the second RAT,
      generate a first message including capability information of the electronic device for the second RAT;
      supply power to the at least one transceiver related to the second RAT;
   in case that the system information does not include the information for the cell of the second RAT,
      generate a second message not including the capability information of the electronic device for the second RAT;
      cut off the power to the at least one transceiver related to the second RAT;
   transmit the first message or the second message to the cell of the first RAT,
   wherein the capability information of the electronic device for the second RAT included in the first message includes a parameter for evolved universal terrestrial radio access (EUTRA) new radio dual connectivity (EN-DC) capability, a parameter for multi-RAT dual connectivity (MR-DC) capability, and information for a security capability of the electronic device for the second RAT,
   wherein both the first message and the second message include information indicating whether the electronic device supports EN-DC regardless of whether the system information includes the information for the cell of the second RAT.

* * * * *